(12) United States Patent
Kalva et al.

(10) Patent No.: US 11,212,336 B2
(45) Date of Patent: Dec. 28, 2021

(54) SYSTEMS AND/OR METHODS FOR DYNAMICALLY CONFIGURING AND EVALUATING RULES WITH DYNAMIC AND/OR USER INPUTS AT RUNTIME

(71) Applicant: Software AG, Darmstadt (DE)

(72) Inventors: Yashwanth Kalva, Bangalore (IN); Shiva Chetan K S, Arsikere (IN)

(73) Assignee: SOFTWARE AG, Darmstadt (DE)

(*) Notice: Subject to any disclaimer, the term of this patent is extended or adjusted under 35 U.S.C. 154(b) by 0 days.

(21) Appl. No.: 16/862,886

(22) Filed: Apr. 30, 2020

(65) Prior Publication Data

US 2021/0344739 A1 Nov. 4, 2021

(51) Int. Cl.
*H04L 29/08* (2006.01)
*H04L 29/06* (2006.01)
*G06F 9/445* (2018.01)
*G06F 16/908* (2019.01)
*G06F 9/54* (2006.01)
*G06F 16/16* (2019.01)
*G06F 9/44* (2018.01)
(Continued)

(52) U.S. Cl.
CPC ............... *H04L 67/02* (2013.01); *G06F 8/40* (2013.01); *G06F 8/41* (2013.01); *G06F 9/44* (2013.01); *G06F 9/44505* (2013.01); *G06F 9/54* (2013.01); *G06F 16/168* (2019.01); *G06F 16/908* (2019.01); *H04L 67/42* (2013.01); *G06F 8/65* (2013.01); *H04L 67/1097* (2013.01)

(58) Field of Classification Search
CPC .......... G06F 8/60; G06F 8/65; G06F 9/44505; H04L 67/02; H04L 67/1097
See application file for complete search history.

(56) References Cited

U.S. PATENT DOCUMENTS 7,185,275 B2   2/2007  Roberts et al.
8,078,962 B2  12/2011  Aoki et al.
(Continued)

OTHER PUBLICATIONS

TypeScript—Decorators, 15 pages [electronically retrieved Apr. 2, 2020] https://www.typescriptlang.org/docs/handbook/decorators.html.
(Continued)

*Primary Examiner* — Tom Y Chang
(74) *Attorney, Agent, or Firm* — Nixon & Vanderhye PC

(57) ABSTRACT

Certain example embodiments relate to web applications. In certain example embodiments, an instance of a web application is executed using a client device. In response to the instance being started up, metadata is retrieved using a service embedded in the application and invoked at a bootstrap hook. The metadata is associated with earmarked programmatic elements in the application. At the client device and using an evaluation service injected into operation of the instance, one or more configured rules are evaluated against input. The rules are definable in relation to the earmarked programmatic elements using the retrieved metadata. They specify behavior of the web application and are dynamically (re)configurable while the instance of the web application is running. The (re)configured rules are dynamically effective without requiring web application redeployment, even if (re)configured while the instance of the web application is running. The instance is controllable responsive to the evaluation.

28 Claims, 26 Drawing Sheets

(51) Int. Cl.
*G06F 8/41* (2018.01)
*G06F 8/40* (2018.01)
*G06F 8/65* (2018.01)

(56) References Cited

U.S. PATENT DOCUMENTS

| | | |
|---|---|---|
| 2006/0015817 A1 | 1/2006 | Fioretti et al. |
| 2009/0271742 A1 | 10/2009 | Zhang et al. |
| 2012/0036565 A1* | 2/2012 | Gamez .............. H04L 63/083 726/5 |
| 2012/0036569 A1* | 2/2012 | Cottrell .............. G06F 21/554 726/7 |
| 2014/0082157 A1* | 3/2014 | Raber ................ H04L 67/34 709/220 |
| 2016/0006803 A1* | 1/2016 | Kumar ............. H04L 67/1091 709/203 |
| 2016/0162451 A1* | 6/2016 | Xu ........................ G06F 8/61 715/205 |
| 2017/0154017 A1* | 6/2017 | Kristiansson ........ G06F 9/4843 |
| 2017/0206090 A1* | 7/2017 | Kirkpatrick ............ H04L 67/34 |
| 2018/0060055 A1* | 3/2018 | Kirkpatrick .......... G06F 9/44521 |
| 2018/0247064 A1* | 8/2018 | Aronovich ........... G06F 21/6209 |
| 2018/0321831 A1* | 11/2018 | Klemenz ................ G06F 9/451 |
| 2019/0014153 A1* | 1/2019 | Lang ..................... G06F 21/604 |
| 2019/0155667 A1* | 5/2019 | Kirkpatrick ............ G06F 9/546 |
| 2020/0137097 A1* | 4/2020 | Zimmermann ........... G06F 9/46 |
| 2020/0153818 A1* | 5/2020 | Chauhan ............... G06F 21/128 |
| 2020/0159509 A1* | 5/2020 | Douglas .................. G06F 8/40 |
| 2020/0201607 A1* | 6/2020 | Bhalerao ............ G06F 9/44505 |
| 2021/0141645 A1* | 5/2021 | Kramer ............... G06F 9/45558 |

OTHER PUBLICATIONS

Decorators Proposal—Stage 2 Draft, 42 pages, Feb. 7, 2019 https://tc39.es/proposal-decorators/.
Wikipedia—Decorator Pattern, 1 page [electronically retrieved Apr. 2, 2020] https://en.wikipedia.org/wiki/Decorator_pattern).
GitHub—TomFrost/Jexl, 8 pages [electronically retrieved Apr. 2, 2020] https://github.com/TomFrost/Jexl.

* cited by examiner

Luxury Air Ticket Form

Flight Name

Passenger Name

Gender

Afghanistan
China
Denmark
Egypt
Finland
Germany
Guinea
Haiti
India
Iran
Japan
Kuwait
Loas
Mexico Meal Type Back    Next

Cab Request Form

Passenger Name

Contact Number

Gender

Pick up point

Pick up time

Drop point

Date

Cab Type

SYSTEMS AND/OR METHODS FOR DYNAMICALLY CONFIGURING AND EVALUATING RULES WITH DYNAMIC AND/OR USER INPUTS AT RUNTIME

TECHNICAL FIELD

Certain example embodiments described herein relate to web application architecture improvements. More particularly, certain example embodiments described herein relate to systems and/or methods that enable web applications to dynamically evaluate on the client side rules that themselves are dynamically (re)configurable, at runtime, without requiring redeployment.

BACKGROUND AND SUMMARY

The advent of computer network technology has changed many facets of day-to-day life. In addition to making information on a wide variety of topics available with just a few clicks or keyboard strokes, for example, the Internet has both changed the ways that people interact with one another and with organizations of all types, and created new opportunities for engaging with people and technology.

These days, it is not uncommon to use so-called web applications to set up video conferences; inform governmental entities of a move, while also updating vehicle and voter registrations, creating new public utilities accounts, and the like; manage smart home devices like thermostats, washing machines, alarm systems, and so on; book travel; order goods and/or services through ecommerce sites; etc. Good web applications typically are organized so that users can "flow" easily and logically through pages or modules in the web applications. In this regard, the "logic" of such flows may be captured using "rules" defining how the web applications are to progress, respond to user input, etc.

Some existing approaches to web application design allow for rules to be configured at design time. Unfortunately, these approach oftentimes sacrifice performance because rule evaluation is performed at the server side at runtime when the web application is up and running. In a similar vein, some existing approaches are accompanied by architectural complexities and require a large infrastructure to meet scaling needs. The additional infrastructure can impose additional design efforts and costs to achieve scale. For instance, a federated architecture where the application functionally is segregated may be needed to achieve scale. But the higher the number of functional modules, the greater the communication and architectural complexity. Intercommunication between modules, systems, and/or the like, can in turn require additional processing logic on the server side to support the same.

In addition, current approaches typically are limited in their ability to provide truly dynamic web applications. In this regard, current applications typically do not provide a flexible approach enabling rule configuration and/or reconfiguration at runtime. Instead, with existing approaches, any changes made typically require redeployment of the web application.

What might seem to be dynamic configuration and evaluation of user interface (UI) navigation in current products actually tends to be quite limited. More particularly, it is common to declare navigation rules at design time. These declared rules typically are executed at the server side and need redeployment for any processing logic changes. There are thus limitations on when and how the rules can be changed. That is, there are limitations on the ability to change and apply rules at runtime, making the rules themselves non-dynamic and hampering the overall dynamic nature of the web application.

Thus, although there have been improvements related to, for instance, using metadata to prescribe a navigation path, the topology of navigation nonetheless is created prior to runtime and cannot be changed dynamically at runtime. Similarly, although there have been improvements facilitating the customization of web user interfaces, for example, such custom pages generally are generated at the server side of the web application and sent to the client side. Because the processing of the input parameters is done the server side, there can be time delays, added operational overhead, and fundamental restrictions on the dynamic nature of the end application and the rules that define its flow.

Existing approaches also tend to be limited on the granularity of control. That is, although some existing tools provide a way to configure UI navigation rules at the page, URL, or path level, existing tools generally do not enable dynamic UI navigation rule configuration and control at the individual field level. Currently available web wizards may provide some functionality in this respect, but they typically have a steep learning curve in terms of required semantics. And even then, current solutions do not easily provide an option for changing the end user experience with on-the-fly dynamic control at field level granularity without any downtime. Instead, any changes to the rules typically require redeployment of the application, which means more downtime. In addition, existing techniques do not provide a simple way to achieve these capabilities. The evaluation is done at server side and is not optimized in a way that makes the UI navigation seamless and immediate. The web application, as well as the approach, typically needs to be built with proprietary software to achieve truly dynamic behavior.

Certain example embodiments help address the above-described and/or other drawbacks of current web application design approaches. For example, certain example embodiments provide an intuitive approach for dynamically configuring and evaluating navigation related rules at runtime. These rules can be defined down to the field level of granularity in certain example instances. Rules can be evaluated on the client side rather than on the server side, even though they are configurable at runtime without requiring web application redeployment. Moreover, the technology platform delivered by certain example embodiments is able to support dynamic rule configuration and evaluation, regardless of whether there is end-user or centralized definition. A single platform thus is both highly flexible in terms of allowing for highly (re)configurable rule definition by an end user or a centralized authority without requiring redeployment, and highly performant by facilitating very granular definition and control based on field level specifications evaluated at the client side. In this sense, certain example embodiments are usable in one of at least two different modes. In a first mode, dynamic configuration takes place in a centralized paradigm where the end user cannot influence navigation or rule definition, and where specification of the navigation and/or other rules is the responsibility of the web service owner or other centralized authority. In a second mode, dynamic configuration takes place at the client side, where an administrative application is provided to the client and thus to the end user through a browser or the like. In this case, the client or end-user is responsible for defining the navigation or other rules.

Certain example embodiments provide navigational flow through a web application, which may be pre-defined at least in terms of the modules included therein. The navigation through the web application may be administered "outside" of this web application, e.g., using suitably configured rules. In accordance with certain example embodiments, a web app "add-in" includes administrative user interface module enabling navigational and/or other rules to be later defined, tools for earmarking fields of the original web application and for setting the right hooks into the web application at runtime, a parser and rule evaluator/execution service, and a database connection for serialization of metadata and rules. At the design time of the web app add-in, the original web application is completed and about to be deployed. A user identifies the list of fields and/or other programmatic elements for each page in the original application. This listing is relevant for the navigation. For example, the user can indicate that the value of certain fields are to be used to execute the conditions of the rules to be defined later. At this point, the specific rules, conditions, values, etc., need not be defined. The metadata implicated by this identification will be saved (e.g., to a database). The original web application will be packaged with the add-in, such that the add-in is a dependency for the original web application. At "configuration runtime" (usually the web application is started), loading the instance (and the dependent add-in) will start a bootstrap process for the instance, where the earmarked fields will be processed and the administrative user interface can be invoked. Using the administrative user interface (either at the client side in the embedded case, or at a different browser in a centralized paradigm) allows rules to be created with reference to the earmarked fields. In the case of a navigational flow embodiment, the "event" where the rules will be executed is the "new page" event (for each page). It will be appreciated that rules also could be processed at various other events that originate from a specific page (e.g., when the mouse is hovered over a field, text is typed into a field and the focus leaves the field, etc.). The rules are stored in the central DB. At "real runtime," the instance of the web application will be executed at the client-side client device (e.g., using a browser running thereon). Again, at bootstrap time, the metadata will be read, the earmarked fields prepared, and the hooks established. When the client triggers the "next page" event (usually by clicking a dedicated field or button), the add-in is invoked via the hook. The rules will be loaded at that time and executed with the help of the parser and rule evaluator/execution service. The result of the condition should reveal the next page to load. This might be a local page within the current application or even an external application (specified by a relative or absolute path definition). Calling an external application may require further care for the definition where to return to in the originating application. Because the rules will be loaded only when the "next page" event fires, the definition of these rules is truly dynamic and has a direct advantageous effect in that the original application does not have to be redeployed in order for the change to be effective.

In certain example embodiments, there is provided a method of executing a web application using a client-side client device including at least one processor and a memory operably coupled thereto. The web application is coded to operate in one of a plurality of different modes, a first mode permitting central rule configuration while prohibiting client-side rule configuration, and a second mode permitting client-side rule configuration. In response to an instance of the web application being started up, metadata is retrieved using a computer-executable retrieval service embedded in the web application and invoked at a bootstrap hook. The metadata is associated with earmarked programmatic elements in the web application. One or more configured rules is/are dynamically evaluated, at the client-side client device using an evaluation service embedded in the web application and injected into operation of the instance of the web application, against input provided in connection with the instance of the web application. The rules are definable in relation to the earmarked programmatic elements using the retrieved metadata. The rules specify behavior of the web application and are configured in accordance with the mode in which the web application is coded to operate. The rules are both dynamically configurable and dynamically reconfigurable while the instance of the web application is running and are dynamically effective thereafter in the evaluation without requiring redeployment of the web application, even if (re)configured while the instance of the web application is running. The operation of the instance of the web application is controlled responsive to the evaluation.

In certain example embodiments, there is provided a client-side client device, comprising at least one processor and a memory, the at least one processor being configured to execute a web application, the web application being coded to operate in one of a plurality of different modes, a first mode permitting central rule configuration while prohibiting client-side rule configuration, and a second mode permitting client-side rule configuration. In response to an instance of the web application being started up, metadata is retrieved using a computer-executable retrieval service embedded in the web application and invoked at a bootstrap hook, the metadata being associated with earmarked programmatic elements in the web application. Using an evaluation service embedded in the web application and injected into operation of the instance of the web application, one or more configured rules is/are dynamically evaluated against input provided in connection with the instance of the web application, the rules being definable in relation to the earmarked programmatic elements using the retrieved metadata, the rules specifying behavior of the web application and being configured in accordance with the mode in which the web application is coded to operate, the rules being both dynamically configurable and dynamically reconfigurable while the instance of the web application is running and being dynamically effective thereafter in the evaluation without requiring redeployment of the web application, even if (re)configured while the instance of the web application is running. The operation of the instance of the web application is controlled responsive to the evaluation.

In certain example embodiments, there is provided a method of preparing a web application for execution, wherein an instance of the web application is executable using a client-side client device including at least one processor and a memory operably coupled thereto. Programmatic elements in the web application are earmarked. A bootstrap hook is set up for the web application such that, when the instance is started up, metadata associated with the earmarked programmatic elements in the web application is retrieved using a computer-executable retrieval service. A plurality of hooks in the web application are created to enable an evaluation service to be injected into operation of the instance of the web application. The evaluation service is programmed to cause dynamic evaluation, at the client-side client device, of one or more configured rules against input provided in connection with the operation of the instance of the web application. The rules are definable in relation to the earmarked programmatic elements using the retrieved metadata. The rules specify behavior of the web application and being configured in accordance with the mode in which the web application is coded to operate. The rules are both dynamically configurable and dynamically reconfigurable while the instance of the web application is running and being dynamically effective thereafter in the evaluation without requiring redeployment of the web application, even if (re)configured while the instance of the web application is running. The operation of the instance of the web application is responsive to the evaluation. The web application is coded to operate in one of a plurality of different modes, a first mode permitting central rule configuration while prohibiting client-side rule configuration, and a second mode permitting client-side rule configuration.

In certain example embodiments, a computing system is provided. The system includes a client-side client device configured to execute an instance of a web application prepared in accordance with the techniques described herein. An administrative user interface module is configured to enable rule (re)configuration. The computer-executable retrieval service and the evaluation service are packaged with the instance of the web application.

According to certain example embodiments, the metadata may provide path, model, component, and/or label data for the decorated programmatic element associated therewith.

According to certain example embodiments, the metadata may be provided to the client device, stored to a persistent store external to web application, and/or the like. In certain example embodiments, the persistent store may be shareable by plural different web applications. These plural different web applications may be interoperable with one another in certain example embodiments. Additionally, or in the alternative, in certain example embodiments, one of the web applications may be coded to operate in the first mode and another one of the web applications may be coded to operate in the second mode.

According to certain example embodiments, the earmarked programmatic elements may be earmarked at design time prior to deployment of the web application.

According to certain example embodiments, the rules specifying behavior of the web application may be conditioned at least in part on the input, with the input potentially comprising user input; a value from a database, function, and/or remote API call; and/or the like. In certain example embodiments, a web application context object may be used as at least some of the input for the dynamic evaluation.

According to certain example embodiments, at least some of the rules may determine navigation within the instance of the web application, e.g., with the evaluation service being triggered via hooks inserted at different pages in the web application.

According to certain example embodiments, user input reconfiguring one or more of the rules may be received. In certain example embodiments, following the receipt of the user input reconfiguring one of more of the rules, different instances of the web application operating with different client-side client devices may function differently in response to the same input.

According to certain example embodiments, the rules may be (re)configurable by an end user of the client device.

According to certain example embodiments, the rules may be configured post-deployment and may be further (re)configurable post-deployment.

According to certain example embodiments, the packaged web application may be deployed to the client-side client device.

According to certain example embodiments, the administrative user interface module may be inaccessible by the client-side client device.

According to certain example embodiments, the administrative user interface module may be packaged with the instance of the web application and may be accessible by an end user using the instance of the web application.

According to certain example embodiments, the client-side client device may be configured to execute the instance of the web application using a browser stored thereon.

It will be appreciated that in certain example embodiments, the metadata may be retrieved, the rules dynamically evaluated, and the operation of the web application controlled, on initial web application start-up (e.g., an initial page load), a page or module load or refresh, and/or the like.

In certain example embodiments, a non-transitory computer readable storage medium tangibly stores instruction that, when executed by a processor of a client-side client device, performs the methods summarized above and described in detail below.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 2 is an example screenshot listing and enabling management of rules applicable to user interface components and their decorated items, created in the rule builder of certain example embodiments;

FIG. 10 is an example basic details page that may be used in connection with an example travel agency web application;

FIG. 12 is an example page that may be used to book an economy class ticket in accordance with the default action specified in FIG. 11;

FIG. 13 is an example page that may be used to book a "luxury" ticket if the conditions specified in FIG. 11 are met;

FIG. 15 is an example taxi hiring page that may be triggered based on the FIG. 14 rule;

FIG. 21 is an example taxi hiring page that may be reached as a result of the FIG. 20 rule;

DETAILED DESCRIPTION

Figure 1:
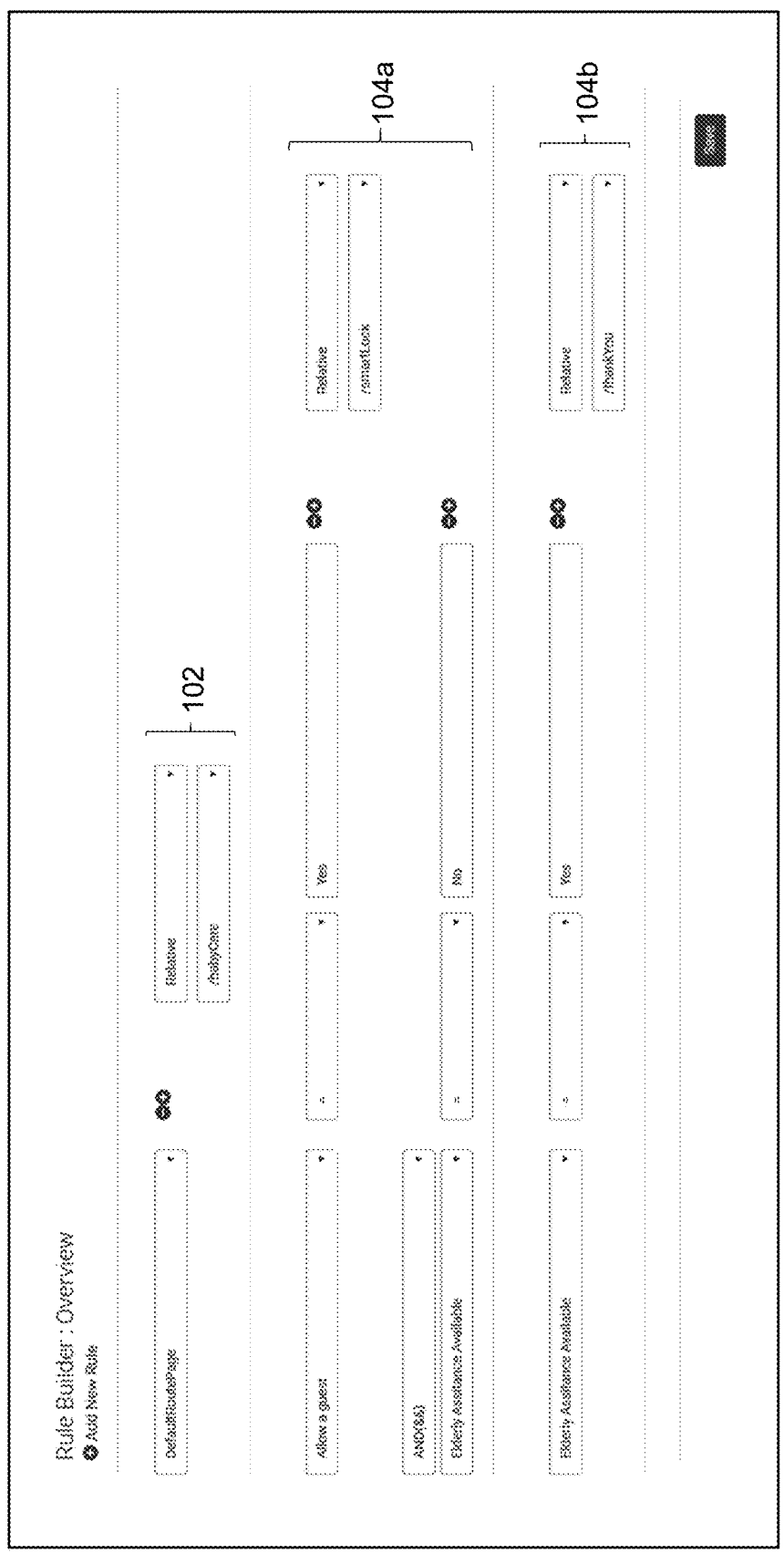
FIG. 1 is a screenshot of an example web wizard that may be used to configure rules using decorated items, in accordance with certain example embodiments.

Certain example embodiments relate to improvements in web application design and deployment. In that regard, certain example embodiments provide an intuitive approach for dynamically (re)configuring and evaluating rules at runtime. The inputs to fields used in these rules can be provided by user and/or supplied dynamically by the application, e.g., as a result of a remote application programming interface (API) call, web service (WS) call, and/or the like. The singular or unified technological platform provided by certain example embodiments advantageously enables rules to be defined by the end user or by a centralized authority, and these rules can be evaluated on the client side for enacting controls (e.g., to navigation, connected devices, and/or the like) on the client side.

Advantageously, with minimal changes to the underlying web application itself, certain example embodiments can adapt the web application and configure rules based on user-defined criteria, even at a data field level, all at runtime. Advantageously, certain example embodiments enable even non-technical users to manage or change the end user UI navigation experience dynamically at runtime with no downtime, insofar as rules can be rules can be easily configured and dynamically evaluated at runtime on the client side. In addition, scaling policies can be set to control the navigation of application flow across web pages or, in general, for any kind of identifiable web resources hosted across hosts.

Certain example embodiments allow for the definition of flexible navigation rules on client side at runtime. The rules themselves can be dynamically changed and dynamically evaluated based on, for example, user-provided values (e.g., that are keyed in as values or input fields or), more complex actions (e.g., database calls, function calls, remote API calls, etc.), and/or the like. These rules can be used to define the navigation within the same web application, as well as navigation between different applications running on different hosts (similar to a "redirect").

Because certain example embodiments fundamentally leverage client capabilities, better scaling and more personalization becomes possible, e.g., as compared to existing solutions. Moreover, it is possible to provide better control over guiding the user journey and enhance the ability to optimize the utilization of application infrastructure and/or resources. In these veins, certain example embodiments provide technical improvements relative to existing solutions for defining web applications. These technical improvements result from the disclosed approach of allowing rules to be defined by the user, e.g., for navigation and/or other purposes, in a web application, with these rules being dynamically evaluable at runtime and being dynamically (re)configurable without requiring redeployment. These technical improvements involve, for example:

- Optimized (faster) rule evaluation, as rule evaluation happens at client side without requiring server communication;
- The ability to dynamically change rules based on user-defined criteria, even at a data field level at runtime, further highlighting the dynamic nature of the web application design and implementation;
- The ability to dynamically supply inputs or values used in the rules being evaluated (e.g., referencing user-provided values, selection of "earmarked" fields, and/or the like);
- A reduced need for the developer to custom-code processing logic, given that typical scenarios can be pre-programmed, earmarking of inputs are possible, custom rules can be patterned or modelled, etc.;
- Enabling reconfiguration of rules without requiring need redeployment of the web application;
- Ease of integration with existing applications, e.g., by virtue of the generic, modular, and easily adaptable structure of certain example embodiments; and
- An intuitive and easy-to-use web wizard to configure rules using non-technical or domain-specific naming conventions of the fields.

Example Implementation

Details concerning an example implementation are provided below. It will be appreciated that this example implementation is provided to help demonstrate concepts of certain example embodiments, and aspects thereof are non-limiting in nature unless specifically claimed. For instance, example use cases are provided below to ease understanding of the example embodiments described herein and are not limiting unless explicitly claimed.

Certain example implementations may make use of Typescript and Angular. As is known, Typescript is a programming language that is a superset of JavaScript that places an emphasis on strict types, and Angular is a typescript-based framework for building client-side web applications. The use of Angular helps bring in modularity by design. Certain codes snippets are provided below with this in mind. It will be appreciated that the use of Typescript, JavaScript, Angular, etc., is exemplary and provides certain advantages. However, the techniques set forth herein may be implemented in different ways in different example embodiments.

It will be appreciated that certain example embodiments provide an efficient, agile approach for fine-grain control over the navigation of web applications running on potentially different hosts. The building blocks of certain example embodiments include a custom decorator, functions used as hooks in the web application, a rule check service, and a rule builder. Each of these building blocks will be described, in turn, below.

For the first building block, a custom decorator is to annotate the model objects or variables that comprise the web application, to provide metadata-like field labels and types that will be usable at runtime in the rule builder. A decorator may be thought of as being a design pattern that helps to enable the addition of metadata on or related to an attribute or field or model to make it available for further processing. Annotating the model objects or variables in this way ultimately makes it easier for a user to define rules, as will be appreciated from the description below.

Through the custom decorator, the following is specified:
path: The relative route to the page (or other object) in which the decorated item is used.
modelName: The name of the model used for the component.
componentName: The name of the component.
labelName: A JSON or other structure with a key as label name and a value as a display name for a correspondent label along with type.

The item that is annotated with the custom decorator is a way to "earmark" the fields of interest that can be used as part of configuring rules at runtime.

The following code snippet is an example custom decorator that used to annotate a model for a baby/elderly care component that may be built into a web application.

```
import{classMetaData}from
        '../../FormFlowPackage/services/class.metadata.decorator
@classMetaData({
    path: ['/babyCare'],
    modelName: 'BabyElderlyCare',
    componentName: 'BabyElderlyCareComponent',
    labelName: {
        feedQuantity: 'Per Feed in ml:number',
        feedInterval: 'Feed Interval:number',
        streamInterval: 'Enable Battery Backup:number',
        reminderTime: 'Remind me at:text',
        snoozeTime: 'Snooze:text',
    }
})
export class BabyElderlyCare {
    constructor(
        public feedQuantity?: number,
        public feedInterval?: number,
        public streamInterval?: number,
        public reminderTime?: string,
        public snoozeTime?: string,
    ) { }
}
```

As can be seen, in this example, there is a "babyCare" directory associated with this "BabyElderlyCare" model. The model has an associated component named "BabyElderlyCareComponent", which can be used to specify actions or events related to feeding quantities, intervals, reminders, etc.

For property decorators, standard Typescript property decorators may be used.

The following code snippet is a custom decorator implementation that may be used to collect field metadata and put into a map, in certain example embodiments.

```
import { ModelDataService } from './model-data.service';
import { MetaService } from '././services/meta.service';
import { ReflectiveInjector } from '@angular/core';
export function classMetaData(classData) {
/**
 *
 * @description
 *      This is ClassDecorator
 * @version 1
 *
 */
        // this.items = { };
        classData.path.forEach(element => {
                a.set(element, classData);
        });
        // Store the page details
        const nodeData = {
                'id': '',
                'label': '',
                'x': 0,
                'y': 0,
                'size': 10,
                'route': ''
        };
        const randId = '_' +
        (
                Number(String(Math.random( )).slice(2)) +
        Date.now( ) + Math.round(performance.now( ))
                ).toString(36);
        nodeData['id'] = randId;
        nodeData['label'] = classData.modelName;
        nodeData['route'] = classData.path[0];
        nodeDataMap.set(randId, nodeData);
        console.log('annotator ' + a);
        // return a function closure, which is passed as 'target'
        return function (target) {
                Object.defineProperty(target.prototype, 'metaData', {
                                value: { classData }
                });
                console.log('Our decorated class', target);
        };
}
export function variableMetaData(variableData) {
        console.log(variableData);
        variableData.path.forEach(element => {
                a.set(element, variableData.modelName);
        });
        return function (target: any, key: string) {
                // Object.defineProperty(target, key, {
                //                configurable: false,
                //                get: ( ) => variableData
                // });
        };
}
export const a = new Map( );
export const nodeDataMap = new Map( );
```

With respect to the second building block, functions are used as hooks in the web application. These hooks help invoke a metadata manager by passing the context object representing the model with data. The following code snippet shows the goNextPage( ) function, which here is a hook used to invoke the metadata manager by passing the model or context object.

```
import { Component, OnInit } from '@angular/core';
import { RuleRuleCheckService } from
        '../../FormFlowPackage/services/rule.check.service';
import { Location } from '@angular/common';
import { BabyElderlyCare } from './baby-elderly-care';
@Component({
        selector: 'app-baby-elderly-care',
```

-continued

```
    templateUrl: './baby-elderly-care.component.html',
    styleUrls: ['./baby-elderly-care.component.css']
})
export class BabyElderlyCareComponent implements OnInit {
    model = new BabyElderlyCare(100,90,5,'13:00','11:00');
    constructor(
        private ruleCheckServiceruleCheckService: RuleCheckService,
        private location:Location
    ) {
    }
    ngOnInit( ) {
    }
    gotoNextPage( ) {
        this.ruleCheckServiceruleCheckService.nextPage(this.model);
    }
    lastPage( ) {
        this.location.back( ); // go back to previous location on back
    }
}
```

As for the third building block, a rule check service may be implemented as an Angular Service in certain example embodiments. The rule check service performs several tasks. First, it retrieves the configured rules for the current component from a persistent store. Second, the rule check service runs the context object against the configured rules. In certain example embodiments, the JavaScript expression language parser, which is composed of handlers, evaluators, and lexical analyzers, may be used for this purpose. The JavaScript Expression Language is an expression language that can be used to parse rules based on logical or mathematical operators. The context object and expressions are taken as input, and the result of rule evaluation on the context object is provided as output. One example that may be used in certain example embodiments is Jexl. Third, the rule check service helps ensure that the corresponding configured web resource or page for a given rule that evaluates to true will be picked. Finally, the rule check service helps ensure that the application will be redirected to that particular page or web resource based on the outcome or decision of the rule. This approach provides control for navigation, or when a decision needs to be made, e.g., based on criteria that can be at a low level of granularity, e.g., an individual data field. It is noted that the fields that may be used as input can be dynamic inputs.

For the last building block, a rule builder is used to dynamically configure rules, e.g., at runtime. The rule builder may be implemented as a command line interface, modeling tool, web wizard, and/or the like. FIG. 1, for example, is a screenshot of an example web wizard that may be used to configure rules using decorated items, in accordance with certain example embodiments. The default route page is specifiable by an absolute or relative location. As shown in FIG. 1, the default route page is shown as a relative link to the babyCare directory in the link section 102. Two rules 104a and 104b are defined to help establish the navigation. The first rule 104a specifies two conditions for the action, namely, if a guest is allowed and if elderly assistance is available, then navigation may flow to the component specified in the smartLock directory. The second rule 104b functions as a default of sorts, specifying that if elderly assistance available than the component specified in the thankYou directory is to be activated. As will be appreciated from this description, Boolean and/or other operators may be added to the rules. Checks for each term may be dependent on the type of data. In this regard, equality operators (equals, less than, greater than, etc.), similarity operators (matches, starts with, like, etc.), and/or others may be used. The variables may be those that are earmarked for the component. The pluses and minuses may be used to add or subtract conditions for each rule.

Figure 2:
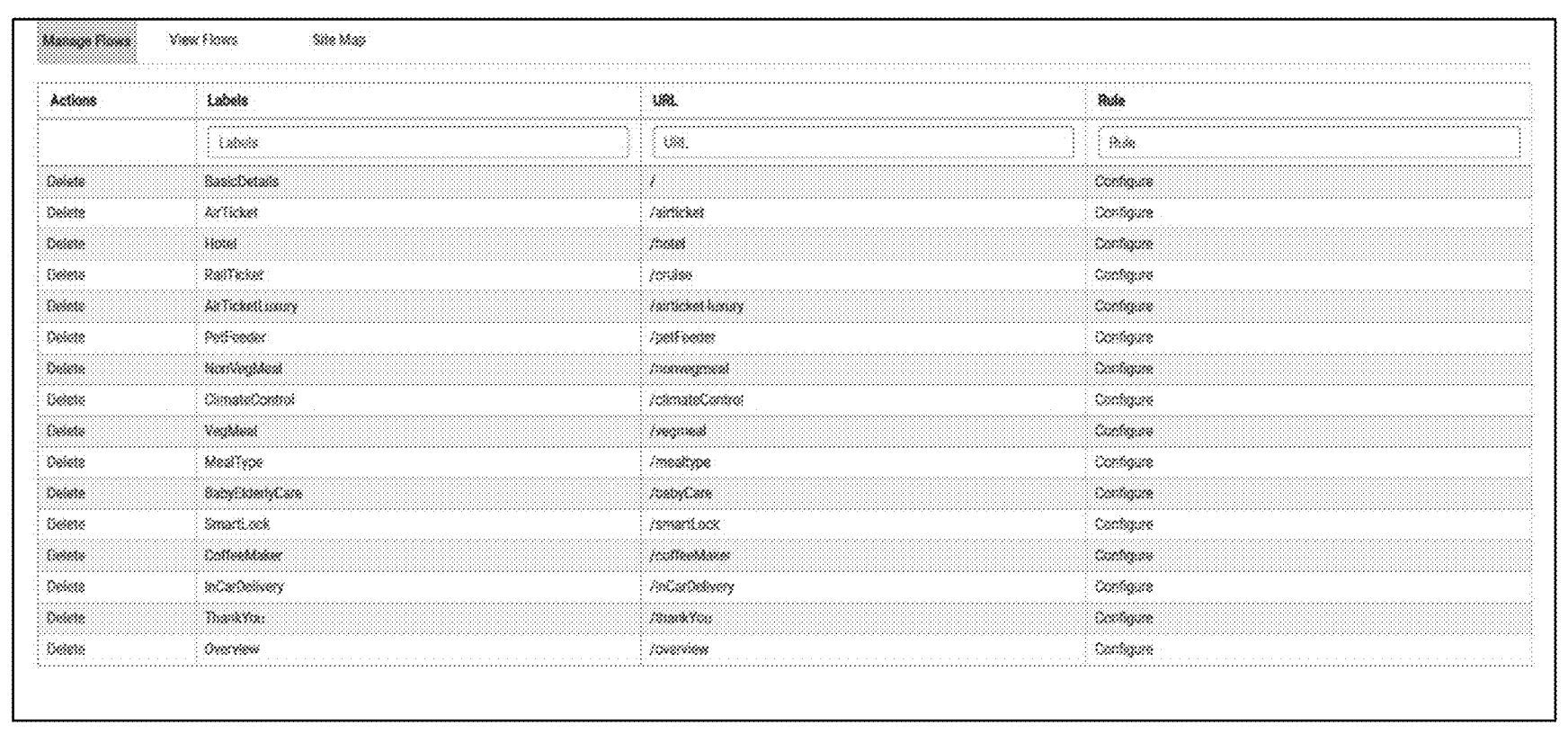
Figure 3:
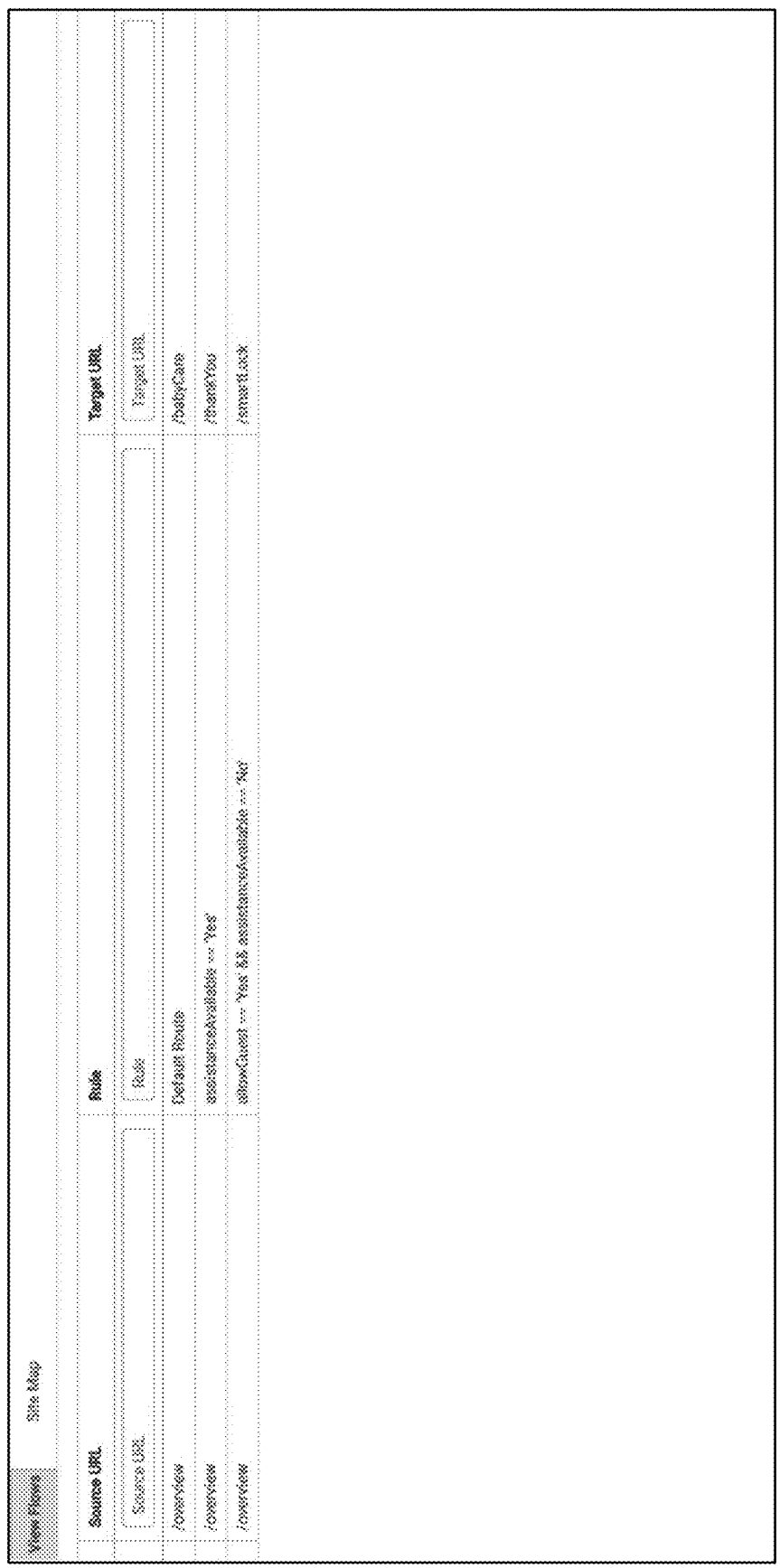
FIG. 3 is an example screenshot showing configured rule listings in connection with navigation flows, in accordance with certain example embodiments.

FIG. 2 is an example screenshot listing and enabling management of rules applicable to user interface components and their decorated items, created in the rule builder of certain example embodiments. The FIG. 2 listing shows basic information such as the labels and paths for the defined rules. It also provides a means by which individual rules can be selected for viewing, editing, deletion, etc. Similar to FIG. 2, FIG. 3 is an example screenshot showing configured rule listings in connection with navigation flows, in accordance with certain example embodiments. FIG. 3 lists the source URL or other location, along with an indication of the role of the rule and the target URLs or other locations that may be triggered.

There are many popular expression language parser libraries that can be used to save time and cost. For instance, as indicated above, the JavaScript expression language parsing library may be used in certain example embodiments. Alternatively, a custom parser may be built, e.g., as a combination of components including handlers, evaluators, lexical analyzers, and/or the like. In any event, in certain example embodiments, the parser runs through each of the configured rules with the context object as input and returns true or false as the result. If true is returned, then the user will be redirected to the mapped destination page route. If it returns false, the user will be directed to the configured default route.

Figure 4:
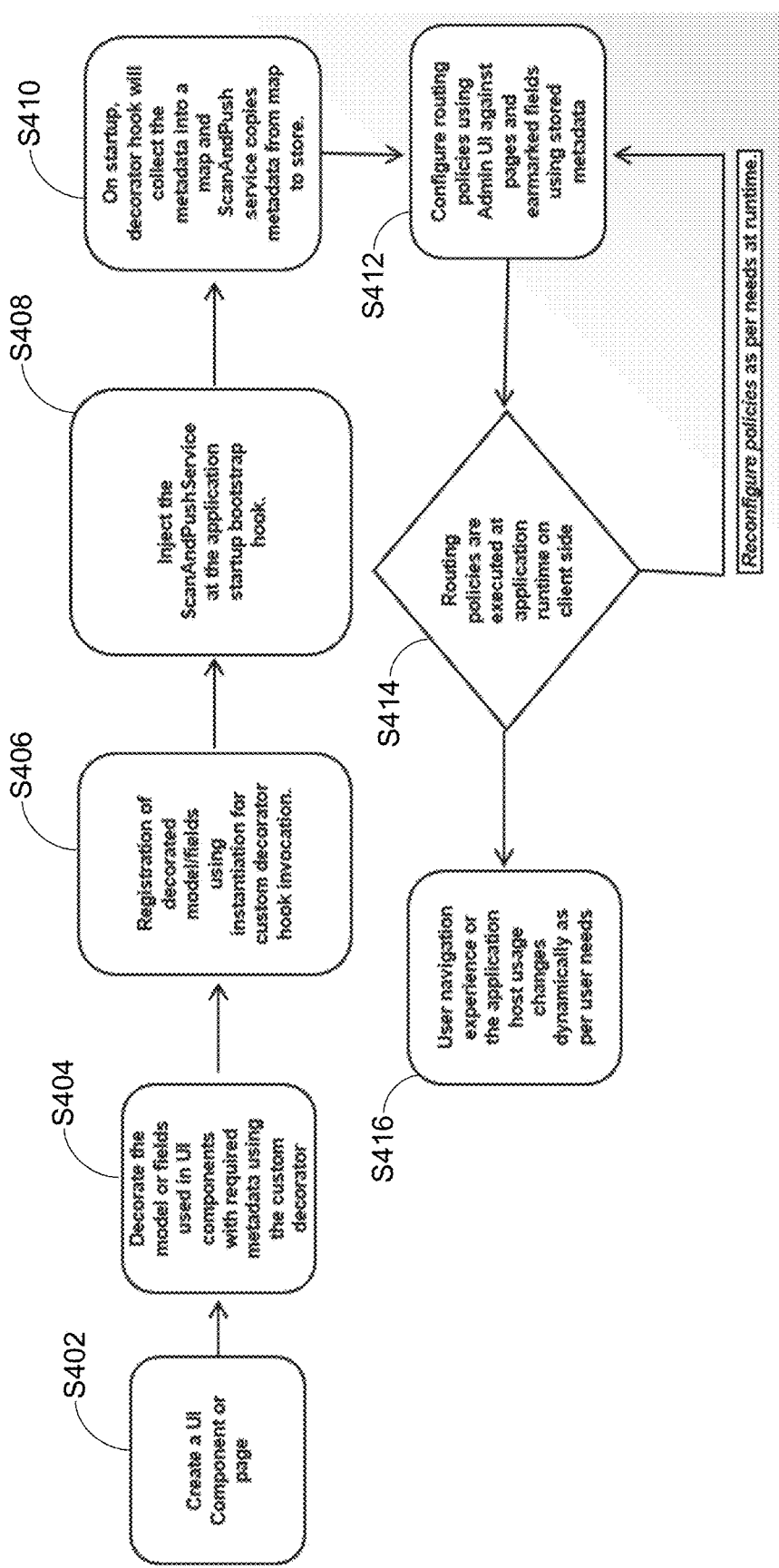
FIG. 4 is a flowchart showing an example process for enabling a web application in accordance with certain example embodiments.

FIG. 4 is a flowchart showing an example process for enabling a web application in accordance with certain example embodiments. In step S402, a UI component or page is created. In step S404, the model or fields used in UI components are decorated with metadata, e.g., of the type described above, using the custom decorator. The decorated model/fields are registered for instantiation via the custom decorator hook invocation in step S406.

In step S408, a scan and push service is injected at the application startup bootstrap hook. As will be described in greater detail below, the scan and push service retrieves the metadata for the decorated items originally collected by the custom decorator processing. As noted in step S410, on startup, the decorator hook with collect the metadata into a map or other similar data structure, with the scan and push service copying metadata from the map to a store. In step S412, routing policies are dynamically configured using an administrative user interface component (described in greater detail below). The configuration takes into account pages and earmarked fields using the stored metadata.

In step S414, routing policies, specified by the rules, are executed at application runtime on the client side. These policies are (re)configurable at runtime, e.g., responsive to input from the Admin UI component. As alluded to above, the Admin UI component may be operated by an end user for certain applications and may be operated by an authorized person in the case of more centralized services in other applications. When there is reconfiguration, the process returns to step S412. As indicated in step S416, the user navigation experience or the application host usage changes dynamically, as needs dictate.

Figure 5:
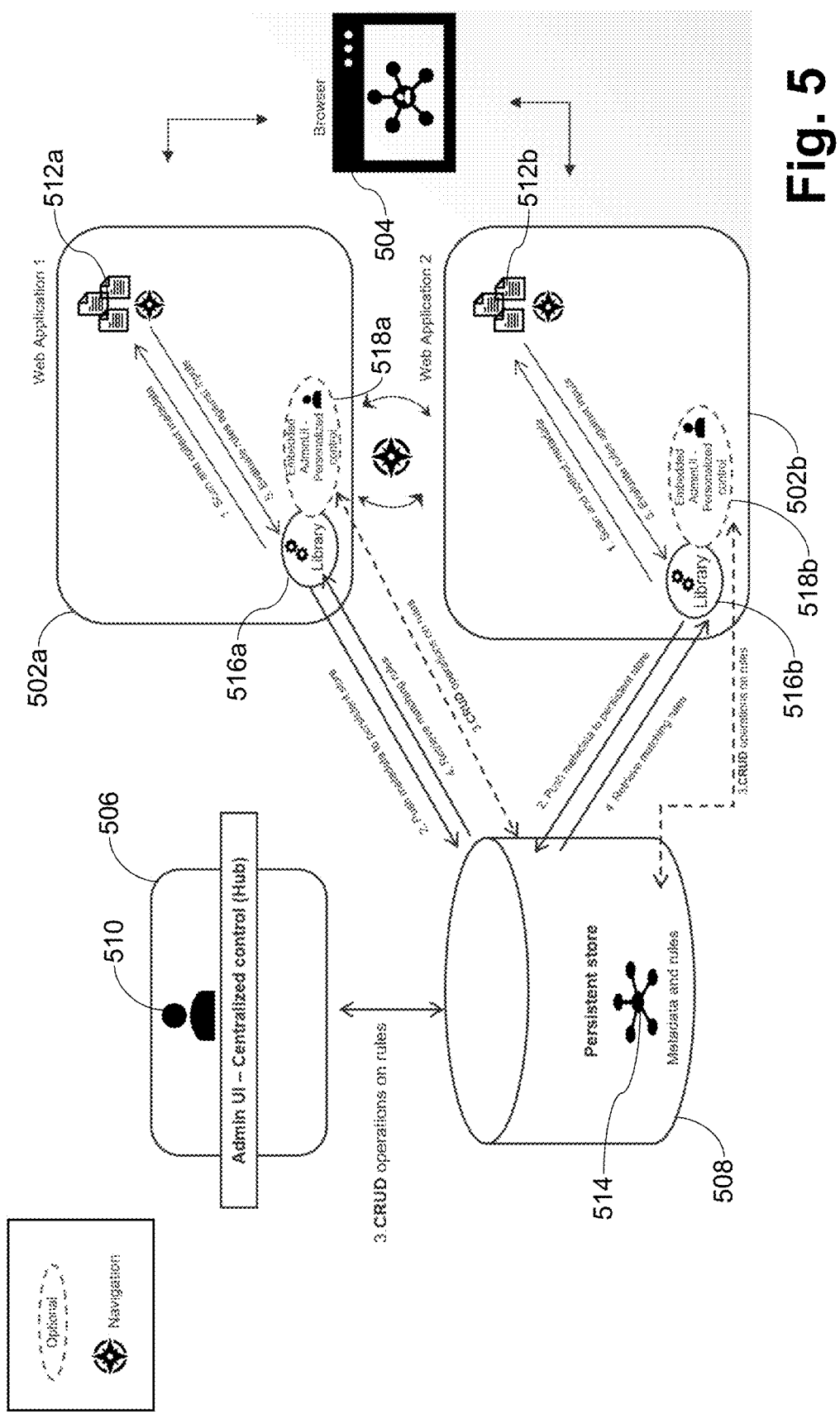
FIG. 5 is a block diagram illustrating a first web application architecture in accordance with certain example embodiments.

FIG. 5 is a block diagram illustrating a first web application architecture in accordance with certain example embodiments. FIG. 5 includes first and second web applications 502a-502b, which are accessible via a browser 504 and are in communication with admin UI components 506 via a persistent store 508. The browser 504 is hosted on a computing system (e.g., a computer, mobile device such as a smartphone or tablet, etc., including at least one processor and a memory, a display device, etc.).

The admin UI components 506 in this example architecture are configured for use in a centralized, or hub-and-spoke architecture, the meaning of which will become clearer from the description below. In the meantime, it will be appreciated that the admin UI components 506 is provided remote from the first and second web applications 502a-502b and the browser 504. The admin UI components 506 may be supported by their own computing system and provide, for an administrator 510, a UI that allows the administrator 510 to perform insert, update, retrieve, delete, and/or other operations on the pages or web resources 512a-512b (located in the first and second web applications 502a-502b, respectively), as well as the associated rules 514 stored in the persistent store 508. In this regard, the admin UI components 506 may provide a web wizard or the like so that the rules 514 can be viewed or configured against each page using relevant earmarked fields. The example interface shown in FIGS. 1-3 may be provided in this regard. Additionally, or alternatively, the admin UI components 506 may provide a programmatic representation of the configured rules 514. Appropriate access policies and validations may be provided for the operations performable by the admin UI components 506.

The first and second web applications 502a-502b include core components (also sometimes referred to as core tools) 516a-516b, respectively. These core components 516a-516b comprise the four building blocks noted above, namely, the custom decorator, scan and push service, rule check service, and the JavaScript expression language parser. Thus, they may constitute libraries of callable or otherwise invokable program logic bundles (e.g., program modules, functions, APIs, and/or the like). Optionally, the first and second web applications 502a-502b may include embedded admin UI tools 518a-518b, respectively, e.g., for a more personalized control over the associated web application. Details regarding these optional embedded admin UI tools 518a-518b are set forth, below.

A decorator is a special kind of declaration that can be attached to a class declaration, method, accessor, property, or parameter. Decorators may in some implementations use the form @expression, where expression evaluates to a function that will be called at runtime with information about the decorated declaration. In certain example embodiments, the decorator construct provided by the programming language may be used. Alternatively, or in addition, the decorator design pattern can be used in certain example implementations.

The scan and push service is a custom Angular service that can be injected at the application bootstrap hook as a startup action that receives the decorated items' metadata collected by the custom decorator processing. This data is pushed into the persistent store in conformance with the persistent store's schema. This data includes mappings between the model and the route in which the model is referenced. Descriptive data such as, for example, unique identifier, label, etc., also may be stored. The service may in certain example embodiments include validations to help avoid duplicate insertions into the store. The persistent store can be any lightweight database, a NoSQL database, or other suitable structure (e.g., supported by a non-transitory computer readable storage medium, stored in memory, and/or the like).

The following code snippet may be used to implement a scan and push service in accordance with certain example embodiments. The scan step in this example is done in the custom decorator implementation to construct the required map/cache.

nodeData['id']=randId;
nodeData['label']=classData.modelName;
nodeData['route']=classData.path[0];
nodeDataMap.set(randId, nodeData);
console.log('annotator'+a);

In this example, the push step is performed after reading the scanned map above:

```
fetchMapAndPush( ) {
    const data = await this.metaService.getNodes( ).toPromise( );
    console.log("Data: " + JSON.stringify(data));
    const nodeSize = data.length;
    if ( nodeSize === 0) {
        let updateCount = 0;
        this.nodeDataMap.forEach((value) => {
            this. metaService.createNode(value).subscribe((data2) => {
                updateCount++;
                if (updateCount === this.nodeDataMap.size) {
                    this.metaService.getNodes( ).subscribe(data1 => {
                        data1 = data1.map( s => {
                            if ( s.hasOwnProperty('label') ) {
                                s.labels = s.label;
                                delete s.label;
                            }
                            return s;
                        });
                        this.source = data1;
                    });
                }
                console.log(data2);
            });
        });
    } else {
        let delCount = 0;
        data.forEach((node) => {
            this.
scanAndPushService.deleteNode(node.id).subscribe((data) => {
                delCount++;
                if (delCount === nodeSize) {
                    let updateCount = 0;
                    this.nodeDataMap.forEach((value) => {
                        this.
scanAndPushService.createNode(value).subscribe((data2) => {
                            updateCount++;
                            if (updateCount === this.nodeDataMap.size) {
                                this.
scanAndPushService.getNodes( ).subscribe(data1 => {
                                    data1 = data1.map( s => {
                                        if ( s.hasOwnProperty('label') ) {
                                            s.labels = s.label;
                                            delete s.label;
                                        }
                                        return s;
                                    });
                                    this.source = data1;
                                });
                            }
                            console.log(data2);
                        });
                        this.timeout( );
                    });
                }
            });
            this.timeout( );
        });
    }
}
```

In the above code snippet, the map/cache is read here to perform the push into the persistent store using a metaService delegation or the like. In this example, fetchMapAndPush is a function of Angular ScanAndPushService. The in this example metaService is a service for CRUD (create, retrieve, update, delete) operations on store. The push example code snippet leverages this example metaService. An example metaService code snippet is provided below. In this example, the metaService simply invokes APIs that perform CRUD operations on the persistent store.

```
public getJSON( ): Observable<any> {
        return this.http.get('http://localhost:' + this.port + '/db');
}
public getNodes( ): Observable<any> {
        return this.http.get('http://localhost:' + this.port +
            '/nodes');
}
public getEdges( ): Observable<any> {
        return this.http.get('http://localhost:' + this.port +
            '/edges');
}
public updateEdge(edge): Observable<any> {
        return this.http.patch('http://localhost:' + this.port +
            '/edges/' + edge.id, edge, httpOptions);
}
public createEdge(edge): Observable<any> {
        console.log(edge);
        console.log(httpOptions);
        return this.http.post('http://localhost:' + this.port +
            '/edges/', edge, httpOptions);
}
public deleteEdge(id): Observable<any> {
        return this.http.delete('http://localhost:' + this.port +
            '/edges/' + id);
}
public updateNode(node): Observable<any> {
        return this.http.patch('http://localhost:' + this.port +
            '/nodes/' + node.id, node, httpOptions);
}
public createNode(node): Observable<any> {
        return this.http.post('http://localhost:' + this.port +
            '/nodes/', node, httpOptions);
}
public deleteNode(id): Observable<any> {
        return this.http.delete('http://localhost:' + this.port +
            '/nodes/' + id);
}
}
```

The persistent store is used to store the metadata associated with the decorated items. This metadata is pushed to the persistent store using scan and push service. The store may conform to a schema or other structured format in certain example embodiments, storing information about pages, rules associated with each page, and metadata supplied by the decorator, e.g., for each page identified with a unique identifier or "page id." An additional identifier, "application id", also may be associated with each web resource in certain example embodiments. This "application id" may be used to help identify to which application the web page belongs.

A sample schema for a persistent store that stores the metadata of the pages and rules associated with them for an example travel agent and smart home application may be as follows:

```
{
    "pages": [
        {
            "id": "_2j1oelps6ig",
            "label": "BasicDetails",
            "x": 0,
            "y": 0,
            "size": 10,
            "route": "/overview",
            "fields": {
                "firstName": "First Name:text",
                "lastName": "Last Name Name:text",
                "age": "Age:text",
                "email": "Email:text",
                "address": "Address:number",
                "gender": "Gender:text"
            },
            "appID": "TravelAgent18091"
        },
        {
            "id": "_mq6cryas8e",
            "label": "SmartLock",
            "x": 0,
            "y": 0,
            "size": 10,
            "route": "/smartLock",
            "fields": {
                "passcode": "passcode:text",
                "recipientMobile": "Recipient Mobile Number -
                    2:number",
                "validity": "validUntil:text",
                "allowAssistantAccess": "Allow Assistant
                    Access :text",
                "isCabRequired": "Book a Cab:boolean"
            },
            "appID": "SmartLock24601"
        }
    ],
    "rules": [
        {
            "id": "zg719t4qhypk35t12v9",
            "source": "/overview",
            "target": "/smartLock",
            "type": "arrow",
            "rule": "allowGuest == 'Yes' && assistanceAvailable ==
                'No'",
            "sourceId": "_2jocub8t15w",
            "destId": "_1a4gmxxb2by",
            "destinationType": "Relative",
            "url": ""
        },
        {
            "id": "0rp7ktlmns5k378t26d",
            "source": "/smartLock",
            "target": "http://localhost:8080/travelApp/cab",
            "type": "arrow",
            "rule": "isCabRequired == 'Yes'",
            "sourceId": "_5x5z6qun04",
            "destId": "_27s5npeuxqf",
            "destinationType": "Absolute",
            "url": "http://localhost:8080/travelApp"
        }
    ]
}
```

It is noted that, in the embedded approach of certain example embodiments, as the admin UI components co-exist with the core components in the same application runtime, it is possible to improve or optimize storage and retrieval operations for the metadata. This may be done by, for example, reading it from the in-memory application map instead of storing it in the persistent store.

The rule check service may be implemented as a custom Angular service in certain example embodiments. This service is injected in each UI component where rules are to be configured. It operates as a delegation service that is invoked by the UI components to decide on the next page in certain example embodiments, e.g., where navigational controls are provided.

Inputs to the rule check service include the context object, which includes the decorated items with values that can be either user provided (e.g., keyed-in or the like) and/or supplied by the application (e.g., via a remote API call, web service response, etc.; the page (e.g., identified by its route) that invoked the delegation service; and a list of rules configured for that page.

The rule check service is operable to perform a number of actions. It can, for example, retrieve a list of rules from the persistent store, and ensure that each rule is evaluated against the context object. Based on the outcome, the rule check service can select the appropriate action (e.g., the appropriate destination or route in a navigation-related implementation). Based on the type of route (e.g., relative or absolute), the rule check service may ensure that the redirection is performed. The following code snippet may be used for navigation as the rule outcome/action:

//Absolute URL redirect window.location.href= defaultTargetNode.route;
//Relative URL redirect using equivalent Angular router _ thisObj.router.navigate([defaultTargetNode.route]);

Alternatively, any other action that is to be performed as the resulting action when a rule evaluates to true can be programmed. There is a broad range of possible actions. For instance, it is possible to invoke a remote API call, start a web service, open a modal dialog, etc.

As noted above, Jexl may be used as the expression parser in certain example implementations. The JavaScript expression language parser comprises handlers, evaluators, and lexical analyzers.

Figure 6:
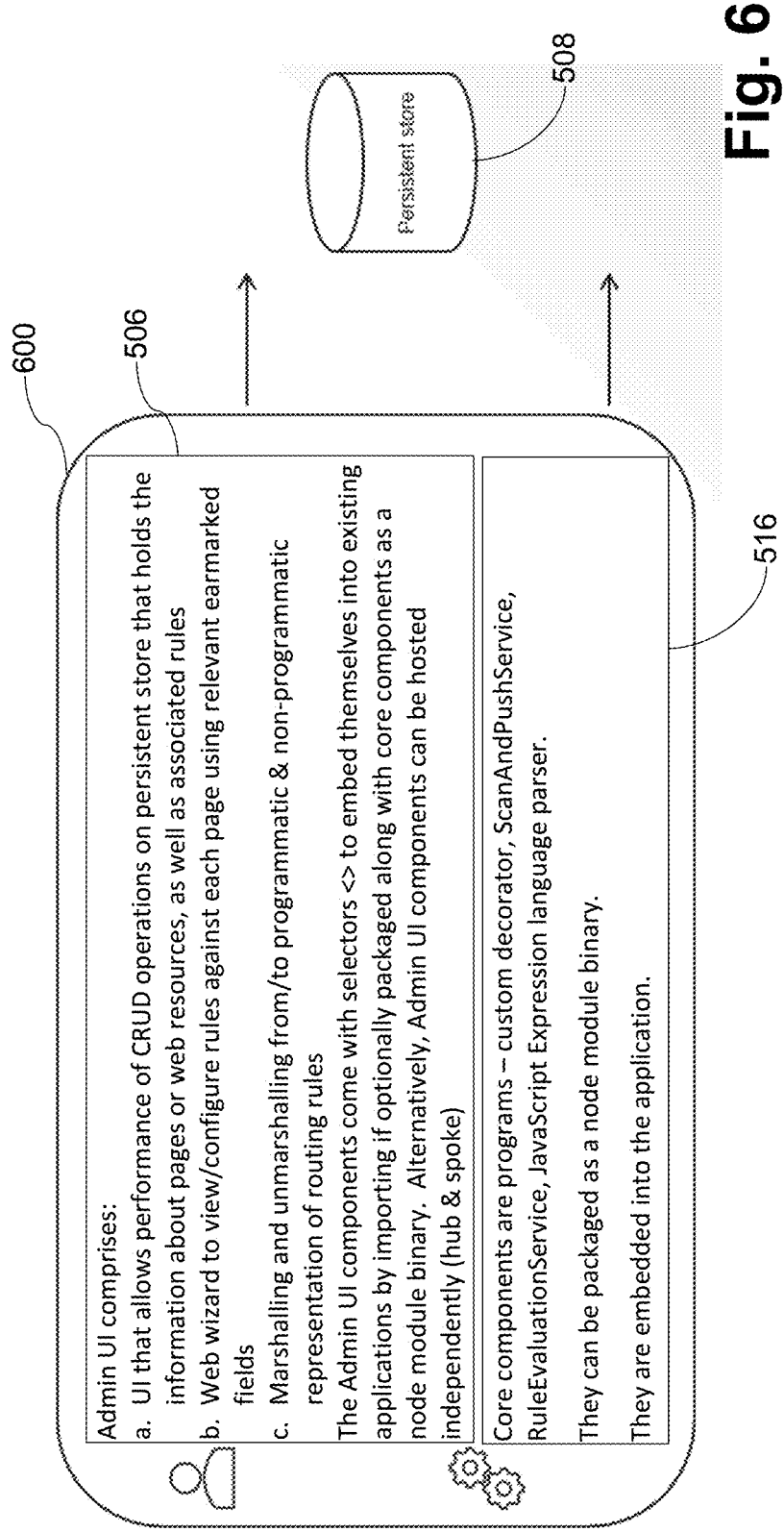
FIG. 6 is a component diagram showing how a node module can be packaged (e.g., an NPM package) to provide the functionality disclosed herein, in accordance with certain example embodiments.

This arrangement is summarized in FIG. 6. That is, FIG. 6 is a component diagram showing how a node module 600 can be packaged (e.g., an NPM package) to provide the functionality disclosed herein, in accordance with certain example embodiments. As can be seen, the node module 600 includes the admin UI component 506 and the core components 516, in communication with the persistent store 508. In certain example embodiments, they may be packaged as a binary. A binary so packaged can be used by a web application in accordance with a wide variety of use cases, including those discussed in detail below.

As alluded to above, the techniques described herein can be used in one of several different potential architectural configurations, namely, an embedded approach and a hub-and-spoke approach. The embedded approach in certain example embodiments involves some redundancy in implementation (e.g., as admin UI interfaces are distributed to or with the web applications themselves), but advantageously provides specific control for the web application owner (who may be the only person who has access to the particular web application). The hub-and-spoke approach may be used in scenarios where more centralized control is desired, e.g., where there is a desire for navigation across web applications and hosts, where shared resources of an organization are being managed, etc. Hybrid scenarios also are possible in certain example embodiments.

Figure 7:
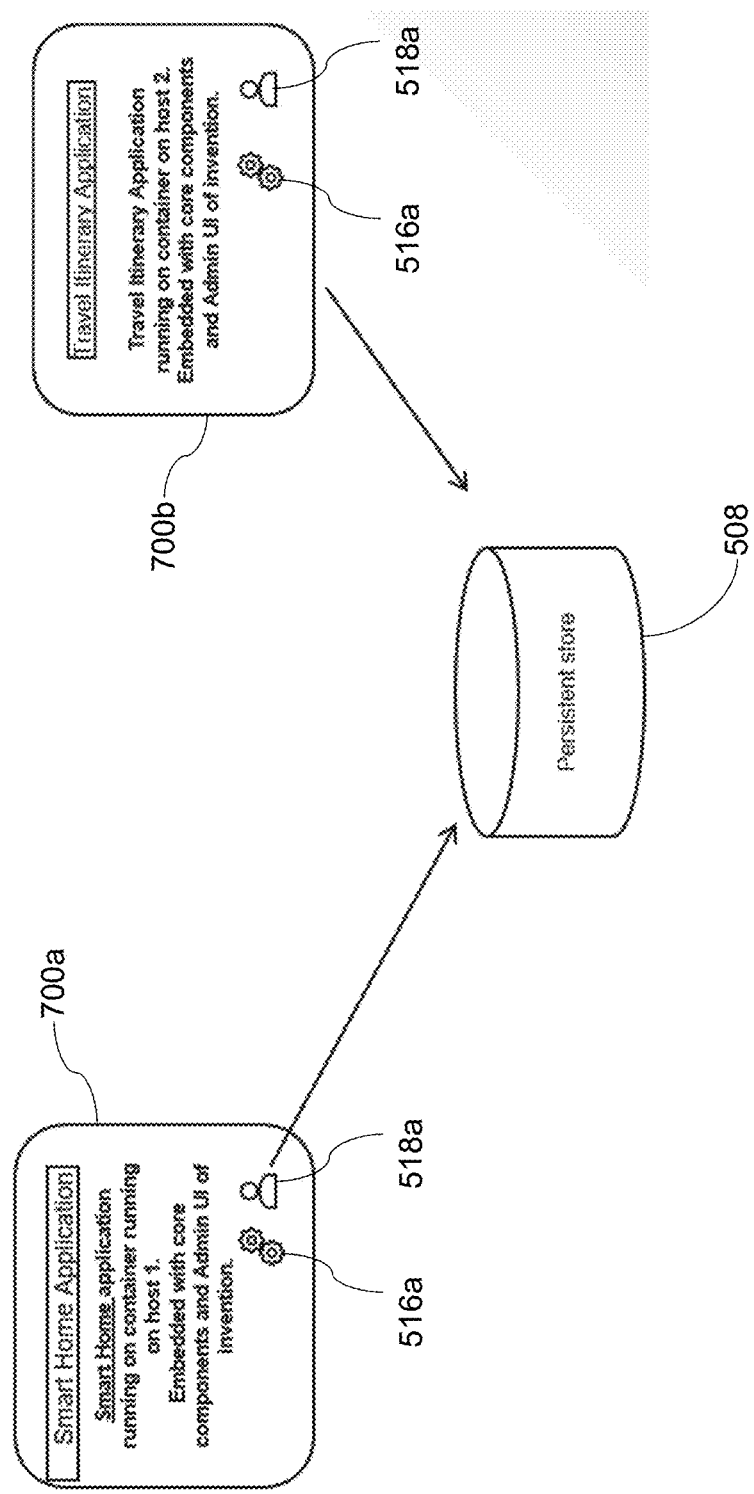
FIG. 7 is a schematic view showing a simplified embedded architecture of certain example embodiments.

FIG. 7 is a schematic view showing a simplified embedded architecture of certain example embodiments. The FIG. 7 example architecture includes two example web applications, namely, a smart home application 700a and a travel itinerary application 700b. The smart home application 700a runs in a container on a first host computing system, and the travel itinerary application 700b runs on a container on a second host computing system in this example. In different example embodiments, the two containers may be provided on the same host computing system. In any event, both web applications have core tool 516a-516b and admin UI components 518a-518b embedded therein. Both the smart home application 700a and the travel itinerary application 700b are in communication with the external persistent store 508.

The core components may be included with web applications, regardless of the architecture selected. The Admin UI components, on the other hand, may be embedded using "selector tags" (< >) or hosted as a separate application (e.g., in hub-and-spoke architecture implementations) in different cases. Appropriate access control may be in place to restrict the access of these Admin UI components in certain example embodiments.

The following straightforward code snippet may be used for admin UI component definition:

@Component({selector: 'app-rule-edit', templateUrl: './rule-edit.component.html', styleUrls: ['./rule-edit.component.css'] })

The following straightforward code snippet may be used for the embedded approach:

```
<a (click)="onClick( )">Configure</a>
<ng-template #ruleModal>
    <app-rule-builder [path]="path" [pageName]="pageName"
    [routerPath] = "routerPath"></app-rule-builder>
</ng-template>
```

Figure 8:
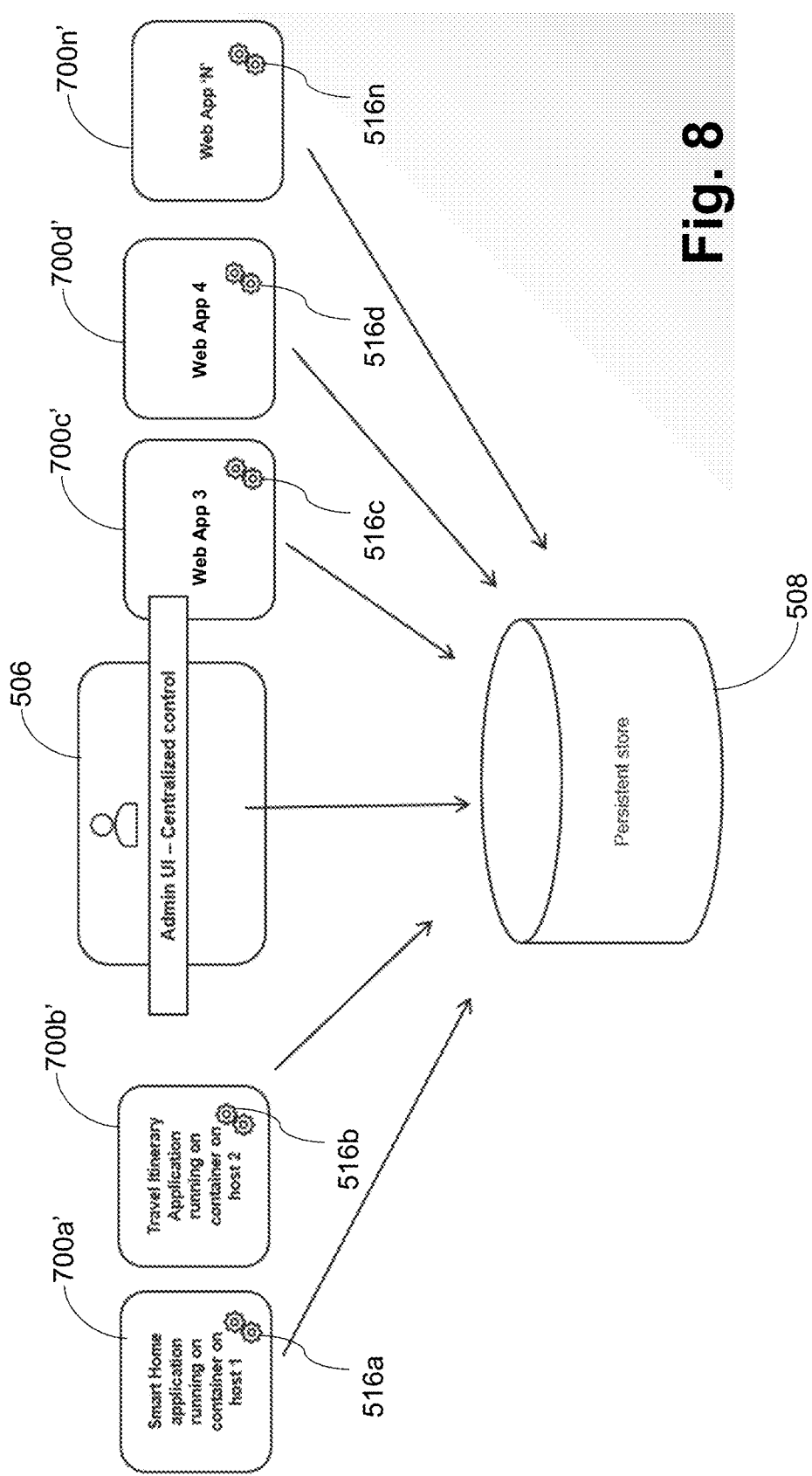
FIG. 8 is a schematic view showing a simplified hub-and-spoke architecture of certain example embodiments.

FIG. 8 is a schematic view showing a simplified hub-and-spoke architecture of certain example embodiments. FIG. 8 is somewhat similar to FIG. 7. However, centralized control is provided by the admin UI component 506, which is external to the various web applications shown. The admin UI component 506 is in communication with the persistent store 508, and the various web applications 700a'-700n'. The web applications 700a'-700n' each have core tools 516a-516n deployed thereto. However, they may lack local instances of the admin UI component. It will be appreciated that any number of web applications may be included in the system and that those web applications may be hosted on the same or different host computing systems, e.g., the same or different containers.

In order to enable the functionality of certain example embodiments, the following procedure may be taken, e.g., in connection with the following code snippets. First, the required items are earmarked using the custom decorator, and the required metadata is provided. This metadata helps identify the mappings between the items and the pages in which they are used. The following code snippet may be used to provide the metadata to custom decorator, e.g., in connection with a coffee maker able to make different kinds and quantities of coffee at different times, and having an alert bell:

```
import { classMetaData }
from '../../FormFlowPackage/services/class-metadata.decorator';
@classMetaData({
    path: ['/coffeeMaker'],
    modelName: 'CoffeeMaker',
    componentName: 'CoffeeMakerComponent',
    labelName: {
        prepTime: 'Time:text',
        coffeeTypes: 'Coffee Type:text',
        quantity: 'Quantity:number',
        ringTheBell: 'Ring the bell:text'
    }
})
export class CoffeeMaker {
    constructor(
        public prepTime?: string,
        public coffeeTypes?: string[ ],
        public quantity?: number,
        public ringTheBell?: string
    ) { }
}
```

Decorated item registration is performed using a constructor in certain example embodiments. This helps ensure that the custom decorator hook is invoked to scan and collect the supplied metadata. The following code snippet may be used as an explicit constructor for the coffee maker:

```
export class CoffeeMakerComponent implements OnInit {
    coffeeTypes;
    model = new CoffeeMaker('17:00', ['Black Coffee', 'Latte',
       'Capuccino'], 200, 'True');
}
```

Second, the scan and push service is injected into the application bootstrap or startup hook. This service scans and collects the decorator metadata and stores it in a map or the like to make it available locally, functioning like a cache. The scan and push service also inserted the metadata into the persistent store in conformance with its schema, e.g., using the metadata-related service metaService detailed above. The insertion is performed with the appropriate required validations, e.g., to help avoid duplicate entries, to store the metadata in accordance with the schema, etc. The example code snippets above (e.g., for constructing the map/cache, performing the push after reading the scanned map, etc.) may be used to implement a scan and push service in accordance with certain example embodiments.

Third, the rule check service is injected in components where navigation or other rules are to be checked. In certain example embodiments, the rule check service may be accompanied by a function that helps the UI component delegate rule decision-making related processes. The rule check service takes the context object as input, along with the source route via which it was invoked. The following code snippet may be used to inject the rule check service into components related to the baby and elderly car example component.

```
import { Component, OnInit } from '@angular/core';
import { RuleCheckService } from
      '../../FormFlowPackage/services/rule.check.service';
import { Location } from '@angular/common';
import { BabyElderlyCare } from './baby-elderly-care';
@Component({
    selector: 'app-baby-elderly-care',
    templateUrl: './baby-elderly-care.component.html',
    styleUrls: ['./baby-elderly-care.component.css']
})
export class BabyElderlyCareComponent implements OnInit {
    model = new BabyElderlyCare(100,90,5,'13:00','11:00');
    constructor(
        private ruleCheckService: RuleCheckService,
        private location:Location
    ) {
    }
    ngOnInit( ) {
    }
    gotoNextPage( ) {
      this.ruleCheckService.nextPage(this.model);
    }
    lastPage( ) {
        this.location.back( ); // go back to previous location on back
    }
```

Fourth, the core components are embedded in the application, as they intercommunicate for metadata scanning and to delegate rule evaluation and decision-making. A wide variety of actions can be performed based on the decision, as indicated above. Navigation, making a remote API call (e.g., to send an SMS notification), pop up a modal dialog showing some specific details, executing a database query, invoking a web service, etc., are all example actions that may be undertaken.

Fifth, the Admin UI components can be embedded along with core components and/or can be maintained as a separate application for centralized control of navigation across hosts (as in a hub-and-spoke architecture). For the purpose of this description, the applications (along with the admin UI components) will be considered spokes, and the persistent store will act as hub. The host name of REST APIs or the like that may be used to communicate with the persistent store can be externalized as an Angular property in certain example embodiments. The metaService code snippet above may be used in this regard. That is, it may help invoke REST APIs to perform CRUD operations on the persistent store. The REST APIs themselves may be resident on the server side in certain example embodiments so that they can properly and more easily interface with the persistent store.

Sixth, the rules are configured using a web wizard or other similar features available via the admin UI components. The configured rules are applicable with immediate effect and will be evaluated on the client side at runtime. These rules can be changed at runtime, as desired based on user input, e.g., using the same web wizard or other interface provided by the admin UI components.

Seventh, at runtime, during user navigation, the rule check service hooks associated with user actions will be invoked with the inputs required. The configured rules for that page are retrieved from the persistent store. The doRuleCheck function is part of RuleCheckService, and the following code snippet may be used to invoke the "meta service" helper function in certain example embodiments.

```
doRuleCheck(model) {
    const _thisObj = this;
    _thisObj.getJSON( ).subscribe(data => {
       const sourceUrl = this.router.url;
       // Search target by rule
       const edgesArray = data.edges;
       const nodesArray = data.nodes;
       const sourceNode = nodesArray.find(node => node.route ===
sourceUrl);
       const requiredRuleEdgesArray = edgesArray.filter(edge =>
                        edge.source === sourceNode.route
&&
                        edge.rule !== undefined);
       let count = 0;
       requiredRuleEdgesArray.forEach(function (requiredRuleEdge) {
          requiredRuleEdge.rule =
          requiredRuleEdge.rule.replace(/%/g,
'');
          const context = model;
          _thisObj.jexl.eval(requiredRuleEdge.rule, context, function
(err, res) {
             count++;
             if (res) {
                count--;
                const targetNode = nodesArray.find(node => {
                   let targetRoute;
                   if ( requiredRuleEdge.destinationType ===
                      'Absolute')
                   {
                      targetRoute =
                      requiredRuleEdge.target.slice(
requiredRuleEdge.url.length);
                   } else {
                      targetRoute = requiredRuleEdge.target;
                   }
                   return (node.route === targetRoute);
                } );
}
```

The persistent store that is visible to the rule check service and other components may be implemented in accordance with a JSON or other schema in certain example embodiments. For instance, in certain example implementations, a lightweight JSON database that comes with ready-to-use REST APIs to perform CRUD (create, retrieve, update, delete) operations on the store maybe selected. The JSON file (an example of which is provided below) may be used as the persistent store. Alternatively, or in addition, a lightweight database, NoSQL database (e.g., a Graph database like Neo4j), or the like may be used in certain example embodiments.

In certain example embodiments, the entire navigational topology may be perceived as a graph, with pages or web resources representing nodes, and with rules representing edges. In this regard, the following example schema may be used in connection with example components for baby/elderly care, smart locks, etc.:

```
{
  "nodes": [
  {
        "id": "_2j1oelps6ig",
        "label": "BasicDetails",
        "x": 0,
        "y" : 0,
        "size": 10,
        "route": "/overview",
        "fields": {
            "firstName": "First Name:text",
            "lastName": "Last Name Name:text",
            "age": "Age:text",
            "email": "Email:text",
            "address": "Address:number",
            "gender": "Gender:text"
        },
        "appID": "TravelAgent18091"
  },
  {
        "id": "_mq6cryas8e",
        "label": "SmartLock",
        "x": 0,
        "y": 0,
        "size": 10,
        "route": "/smartLock",
        "fields": {
            "passcode": "passcode:text",
            "recipientMobile": "Recipient Mobile Number - 2:number",
            "validity": "validUntil:text",
            "allowAssistantAccess": "Allow Assistant Access :text",
            "isCabRequired": "Book a Cab:boolean"
        },
        "appID": "SmartLock24601"
  }, .........
  ...........
  ............
  ],
  "edges": [
  {
        "id": "bkvaoxagps6k35t12v6",
        "source": "/overview",
        "target": "/babyCare",
        "type": "arrow",
        "rule": " 'null'",
        "sourceId": "_2jocub8t15w",
        "destId": "_5b16cej8pv",
        "destinationType": "Relative",
        "url": ""
  },
  {
        "id": "pgno790jysfk35t12v8",
        "source": "/overview",
        "target": "/thankYou",
        "type": "arrow",
        "rule": "assistanceAvailable == 'Yes'",
        "sourceId": "_2jocub8t15w",
        "destId": "_1dm4yg5yrtw",
        "destinationType": "Relative",
        "url": ""
  },
  {
        "id": "zg719t4qhypk35t12v9",
        "source": "/overview",
        "target": "/smartLock",
        "type": "arrow",
        "rule": "allowGuest == 'Yes' && assistanceAvailable == 'No'",
        "sourceId": "_2jocub8t15w",
        "destId": "_1a4gmxxb2by",
        "destinationType": "Relative",
        "url": ""
  },
  {
        "id": "0rp7ktlmns5k378t26d",
        "source": "/smartLock",
        "target": "http://localhost:8080/travelApp/cab",
        "type": "arrow",
        "rule": "isCabRequired == 'Yes'",
        "sourceId": "_5x5z6qun04",
        "destId": "_27s5npeuxqf",
        "destinationType": "Absolute",
        "url": "http://localhost:8080/travelApp"
  },
  .........
  ..........
  ............
  ]
}
```

Eighth, retrieved rules along with the context object are passed as input to the JavaScript expression language parser to provide a result. The following code snippet may be used in this regard:

```
import { jexl } from 'jexl';
@Injectable( )
export class RuleCheckService {
  port = 3001;
  jexl = require('Jexl');
...
  const context = model;
      _thisObj.jexl.eval(requiredRuleEdge.rule, context, function (err, res) {
          count++;
          if (res) {
              count--;
              const targetNode = nodesArray.find(node => {
                  let targetRoute;
                  if ( requiredRuleEdge.destinationType === 'Absolute')
                  {
                      targetRoute = requiredRuleEdge.target.slice(requiredRuleEdge.url.length);
                  } else {
                      targetRoute = requiredRuleEdge.target;
                  }
                  return (node.route === targetRoute);
              } );
```

Ninth, the outcome of the parser determines the resulting destination page or web resource, or other action to be taken. When a destination is provided, it can be a relative or absolute URL or other location. The following code snippet shows how navigation can be performed:

```
if (defaultEdge.rule === 'DefaultRoutePage') {
    const defaultTargetNode = defaultEdge.target;
// nodesArray.find(node => node.route === requiredRuleEdge.target);
    if (defaultTargetNode.route.startsWith('http://')
```

-continued

```
    || defaultTargetNode.route.startsWith('https://')) {
        window.location.href = defaultTargetNode.route;
    } else {
        _thisObj.router.navigate([defaultTargetNode.route]);
    }
    return true;
}
});
```

Example Usage Scenarios

As discussed, the techniques of certain example embodiments are useful for a variety of scenarios including, for example, web applications where dynamic UI navigation is desired. This description encompasses a variety of use cases. For example, with a personalized user experience and rate limiting in a self-service portal, the techniques described herein may be used to build a web application that serves as a one-stop-shop for technology infrastructure needs like buying managed services from a cloud provider, introducing usage restrictions at a user account or tenant level, etc. As another example, the techniques described herein may be used to set rules on the infrastructure of a Software-as-a-Service (SaaS) to route or throttle the traffic or volumes of a public-facing website, e.g., based on the need to achieve scaling. It can even be used as a security measure in case of denial or service attacks to restrict inbound traffic to a UI (for example) from a suspicious client or a specific user or IP address. As another example, the techniques described herein can be used to build a web application for an Internet banking website where there is a desire to cross-sell or upsell products based on some customer attributes. As another example, the techniques described herein can be used to build an ecommerce website where there is a desire to control the way the user navigates through the site from the beginning through checkout (and beyond) including, for example, browsing, buying, adding to a shopping cart, etc. As still another example, the techniques described herein can be used to show and hide some content across the website based on time window, which might be useful, for example, when launching offers based on inputs from upstream pricing systems, etc. As still another example, the techniques described herein can be used to render different content for different users based on their earlier inputs, e.g., to show additional add-ons at a lower price if the user is a regular movie-goer. The end applications are many and varied, and several example use cases will be discussed below in order to help demonstrate the breadth of the example approaches discussed herein. By their nature, however, these use cases are provided by way of example and without limitation.

First Example Use Case: Using Centralized Rules to Restrict Access

Figure 9:
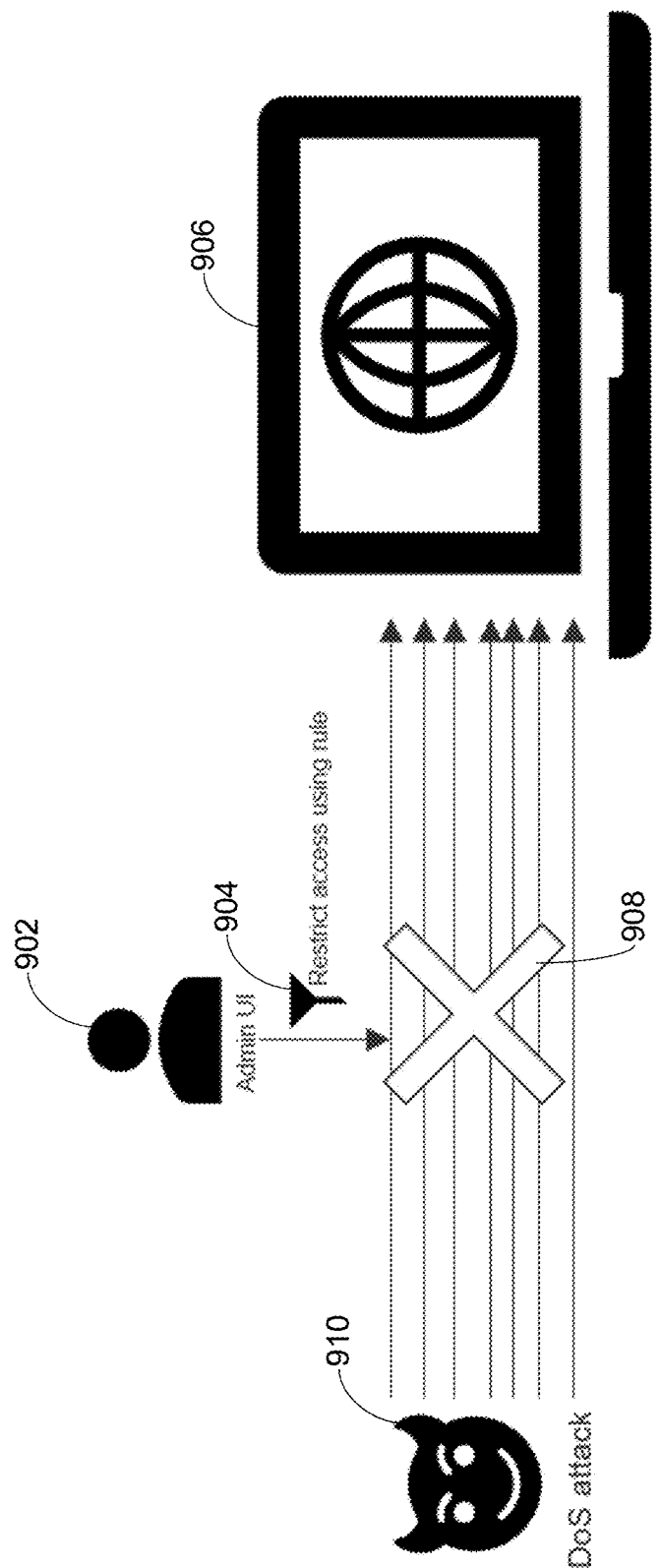
FIG. 9 is a block diagram demonstrating how the techniques described herein can be used to restriction web application UI access for suspicious users, in accordance with an example use case scenario.

In a first example use case, the techniques disclosed herein are used as a security measure to restrict inbound traffic. Specifically, inbound traffic to a UI (for example) is restricted based on a rule related to a client identifier or IP address or user ID. The rule specifies that if a client identifier, IP address (or IP address range), or user ID is not recognized, then some action is taken. The action that is taken may be to throttle traffic, shut ports to unknown or unrecognized incoming connections, etc. This may be useful in a denial of service (DoS) type attack. Additional layers of complexity may be introduced in terms of rule definition, e.g., considering the frequency of incoming connections (in absolute terms or relative to some stored baseline), resource utilization, etc. Rules may be layered so that back-offs (or amount of throttling) can be customized, etc. FIG. 9 is a block diagram demonstrating how the techniques described herein can be used to restriction web application UI access for suspicious users, in accordance with an example use case scenario. As shown in FIG. 9, this is well-suited to a centralized approach, with the admin UI component 902 defining rules 904 indicating when access to web application or other computing resource 906 should be limited or blocked 908, as those inbound connections may be related to a single DoS attack 910.

Second Example Use Case: Embedded Approach to Smart Home and Travel Agency Web Applications Further the purpose of this example use case, consider two hypothetical web applications. A first web application is a smart home application console that acts as a hub to control different smart devices that are used in a home. A second web application is a travel itinerary booking application where one can book a flight, reserve a hotel room, and order a cab.

Figure 10:
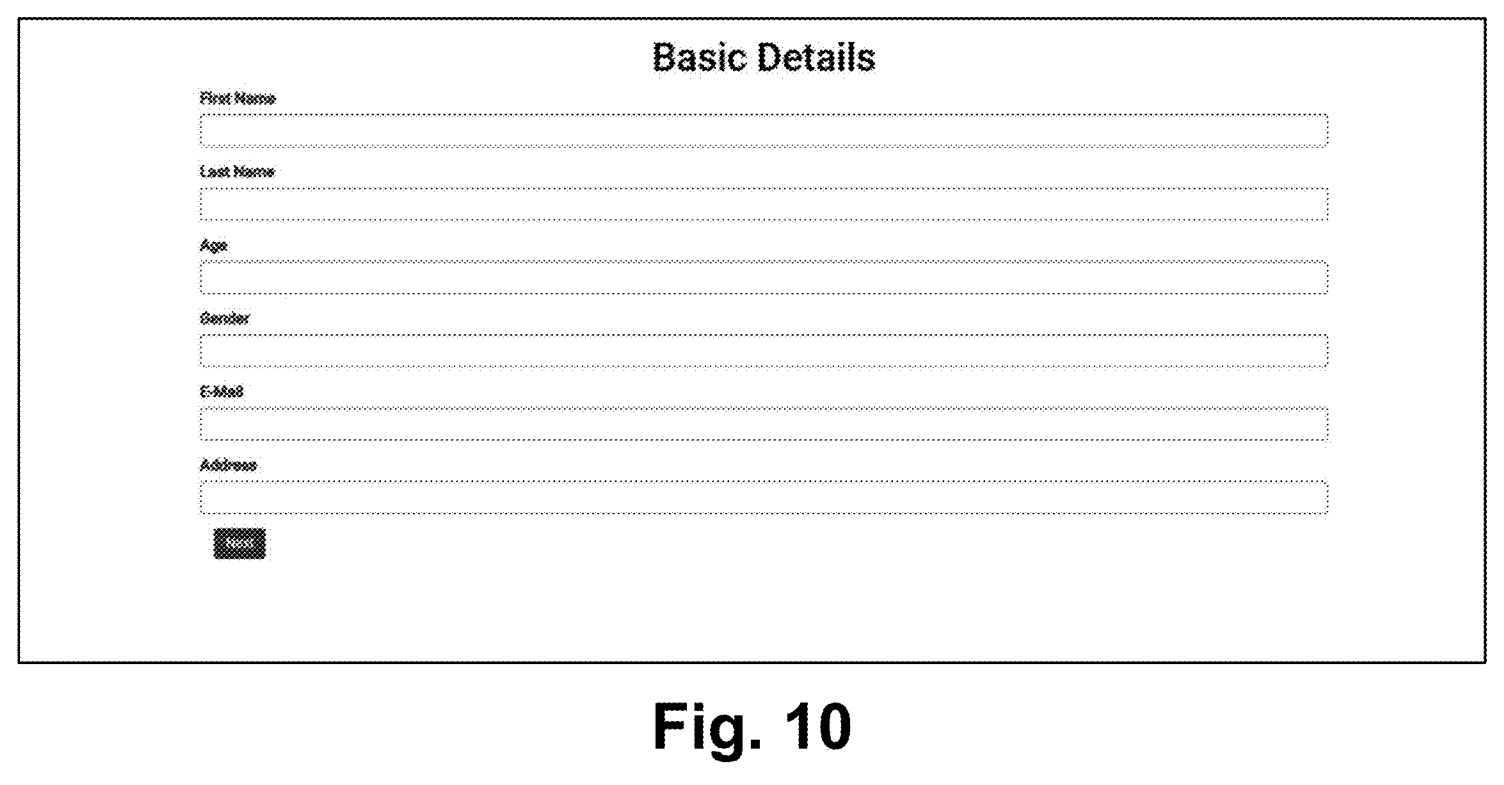

Consider first the travel agency web application, where the embedded approach is employed. Appropriate access privileges are given to the end user to control the access of admin UI components. FIG. 10 is an example basic details page that may be used in connection with an example travel agency web application. When the travel agency web application is accessed, this basic details page will be loaded, so that the user can enter personal details such as, for example, name, age, gender, contact information, etc.

Because the embedded approach is selected here, an authorized user can define rules using the admin UI component provided at a centralized location. Admin UI component is not embedded in the web services, or they are disabled/unavailable to the end-user. Instead, the admin UI component is remotely hosted and may be operable as an application independent form the web applications being configured and used. The core tools are, however, embedded in the distributed web applications.

As a first example rule, the user will use the admin UI component to configure a rule to provide the option to book a flight with business class (using a component found in the "/airticket-luxury" path) only if user is female and aged greater than 40 years. The rule will specify that the user is to be redirected to an option to book the flight with economy class (using a component in the "/airticket" path) if this condition is not met. It will of course be appreciated that these conditions, and the default action, are chosen by way of example and without limitation.

Figure 11:
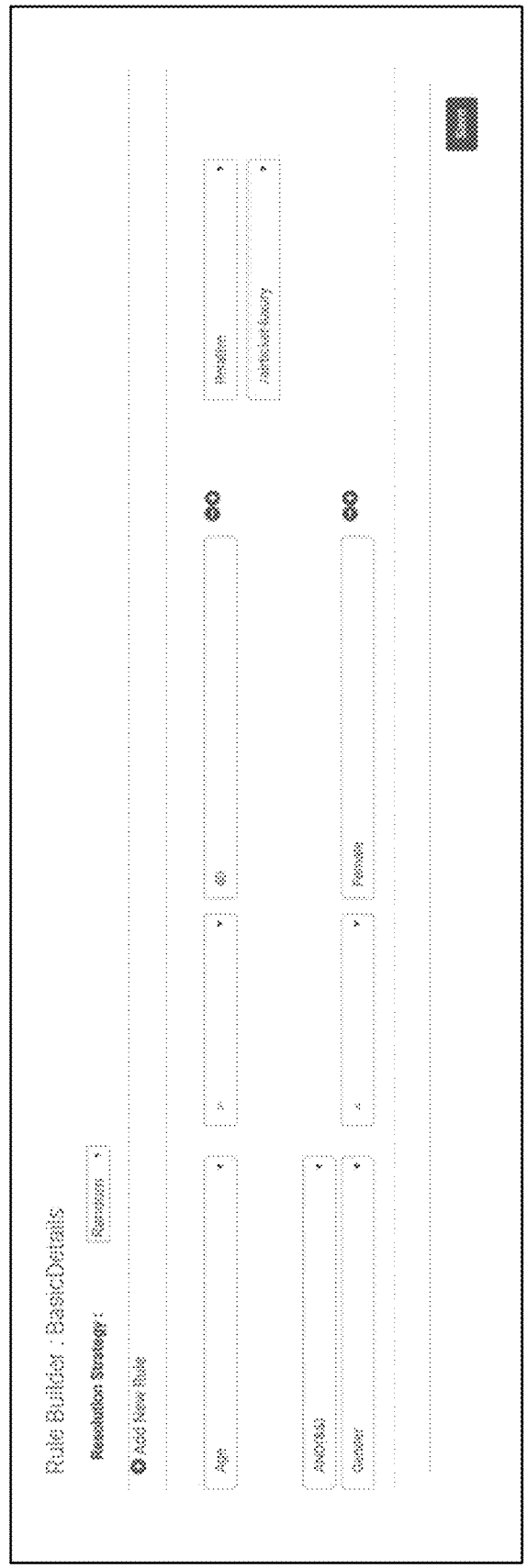
FIG. 11 is an example rule builder page that shows the configuration of an example travel agency related rule.
Figure 12:
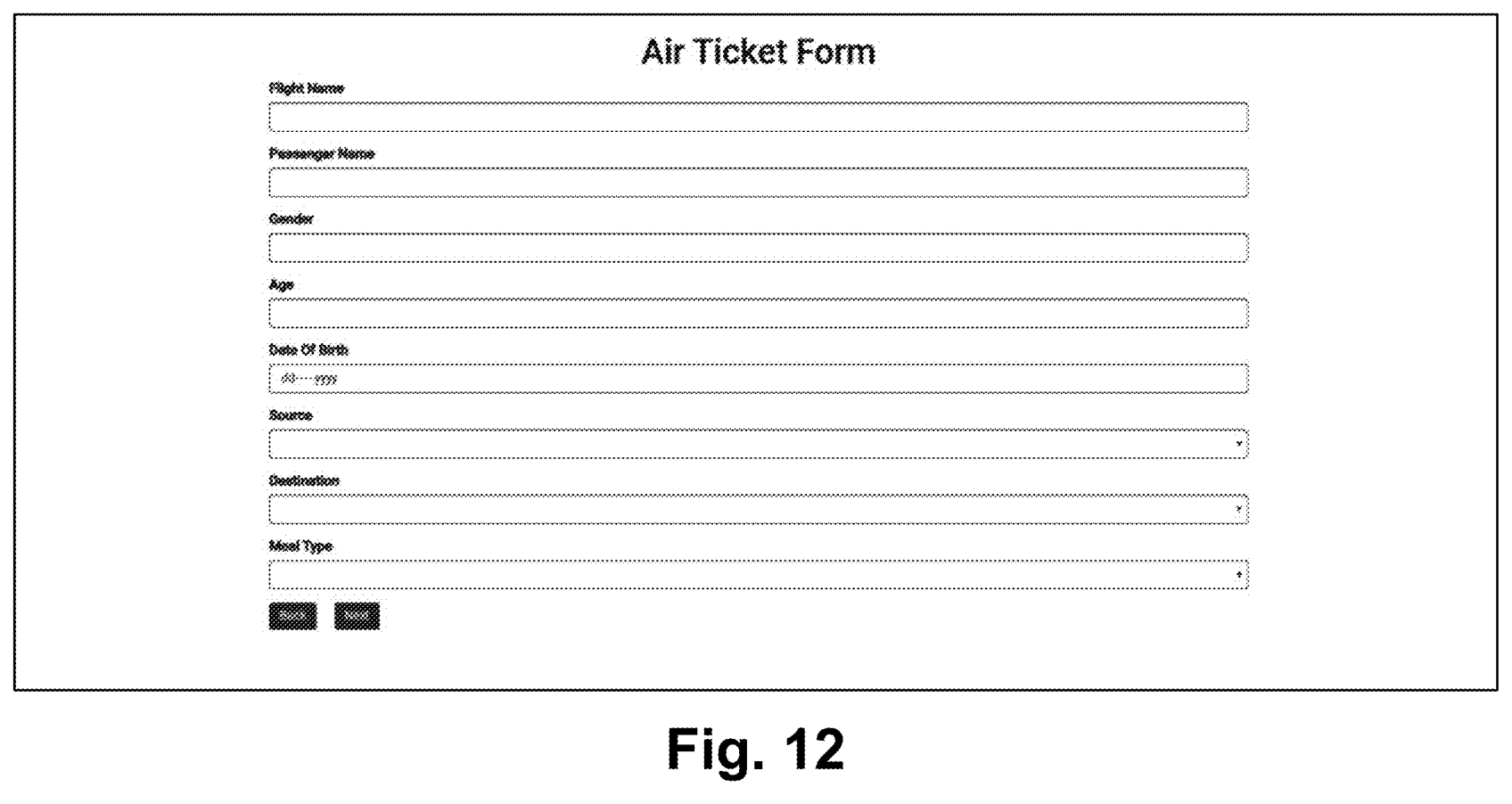

FIG. 11 is an example rule builder page that shows the configuration of this rule. FIG. 11 is similar to the FIG. 1 example rule builder, except that a different rule with different outcomes are being provided for a different application. The structure of the input screen is common as between FIGS. 1 and 11. FIG. 12 is an example page that may be used to book an economy class ticket in accordance with the default action specified in FIG. 11. FIG. 13 is an example page that may be used to book a "luxury" ticket if the conditions specified in FIG. 11 are met.

That is, if user details provided in the FIG. 10 example page do not satisfy the rule specified in FIG. 11, then an option to book flight in economy class will be provided (using the component provided in the "/airticket" path) in accordance with the FIG. 12 example. FIG. 12 is the page for the component provided in the "/airticket" path. Alternatively, if the user is a female older than 40, then an option to book air ticket in a "luxury" class will be provided using the component provided in the "/airticket-luxury" path, as specified in the FIG. 11 rule. FIG. 13 is the page for the component provided in the "/airticket-luxury" path.

Figure 14:
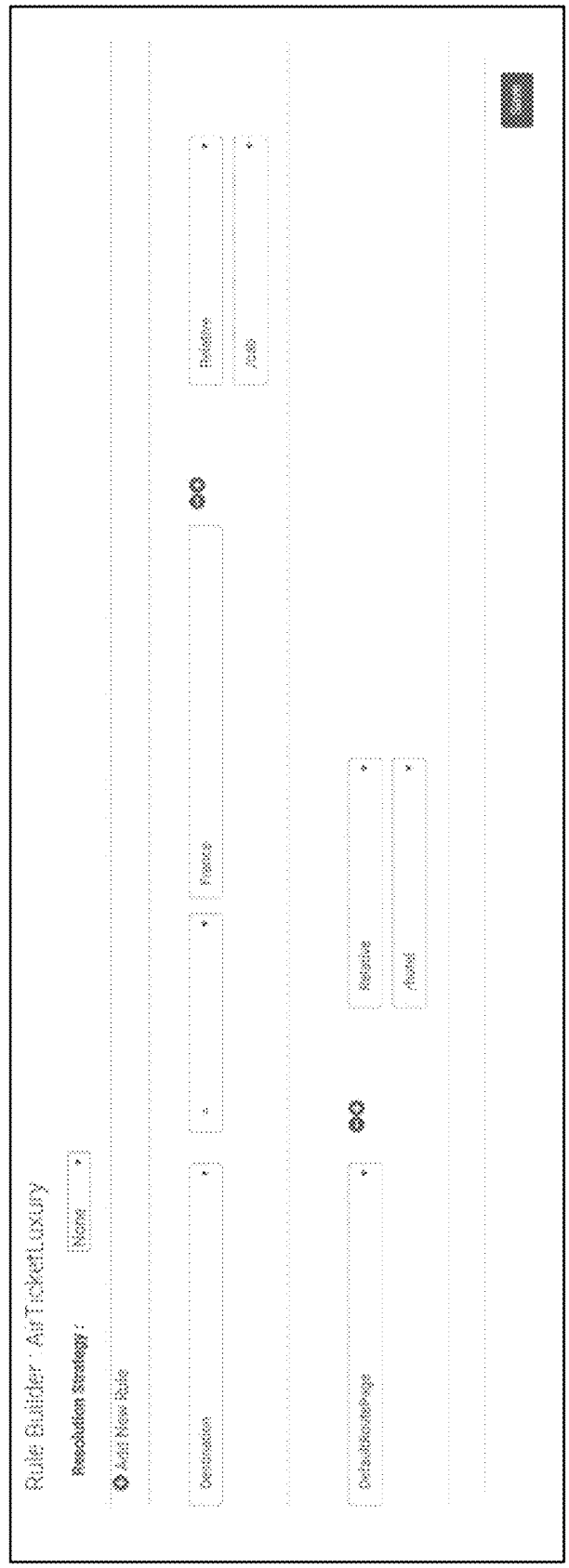
FIG. 14 is a rule builder screen for defining a rule applicable to the page shown in FIG. 13.
Figure 16:
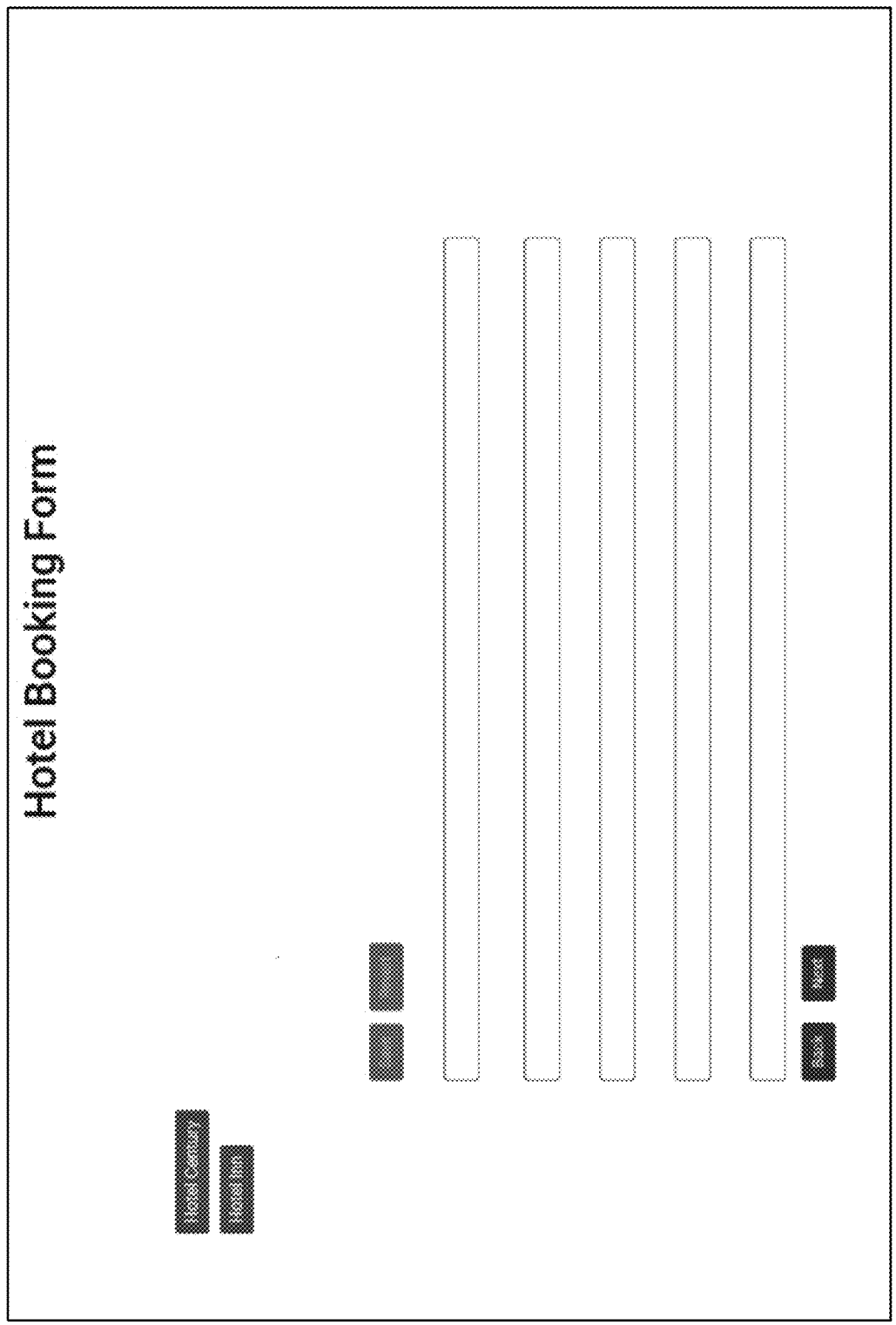
FIG. 16 is an example hotel booking page that may be triggered as the default action from the FIG. 14 rule specification.

One additional rule is added in this example. The new rule specifies that, if the destination chosen as part of the flight is a specific country or place (e.g., France), then the user is to be given an option to book a cab too; otherwise, the default will be to route the navigation to the hotel booking page. In this regard, FIG. 14 is a rule builder screen for defining a rule applicable to the page shown in FIG. 13. Once again, FIG. 14 is similar to FIG. 1 in is structure. It can be seen from FIG. 14 that a booking to France will activate the taxi hire component (specified in the "/cab" path), whereas the default will be the hotel booking component (in the "/hotel" path). FIG. 15 is an example taxi hiring page that may be triggered based on the FIG. 14 rule, and FIG. 16 is an example hotel booking page that may be triggered as the default action from the FIG. 14 rule specification.

Third Example Use Case: Hub-and-Spoke Approach to Smart Home and Travel Agency Web Applications This use case is similar to the prior use case, except that the hub-and-spoke approach is used here, providing the end user with additional control over the web applications. Admin UI components and core tools thus are both embedded in the web applications and accessible to the end user. The embedded (and locally-hosted) admin UI components can access the persistent store.

Figure 17:
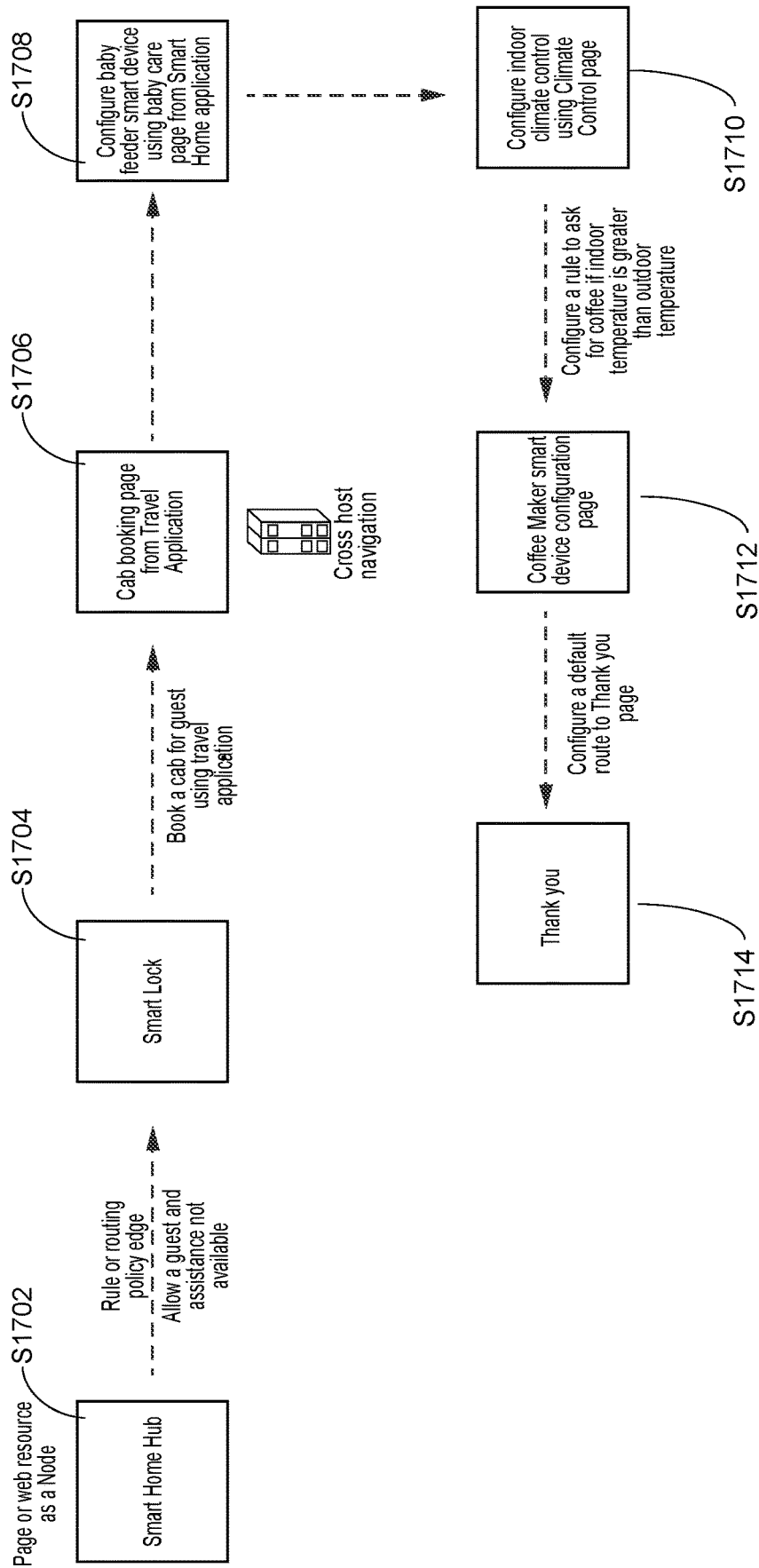
FIG. 17 is an example flowchart showing cross-application navigation as between example smart home and travel agency web applications.

Cross-application navigation is provided in certain example embodiments. This may be provided in either approach, but the implementation may be easier in the hub-and-spoke approach. In this regard, FIG. 17 is an example flowchart showing cross-application navigation as between example smart home and travel agency web applications. FIG. 17 is provided as an overview, and details regarding the operation of FIG. 17 are set forth in greater detail below.

Figure 18:
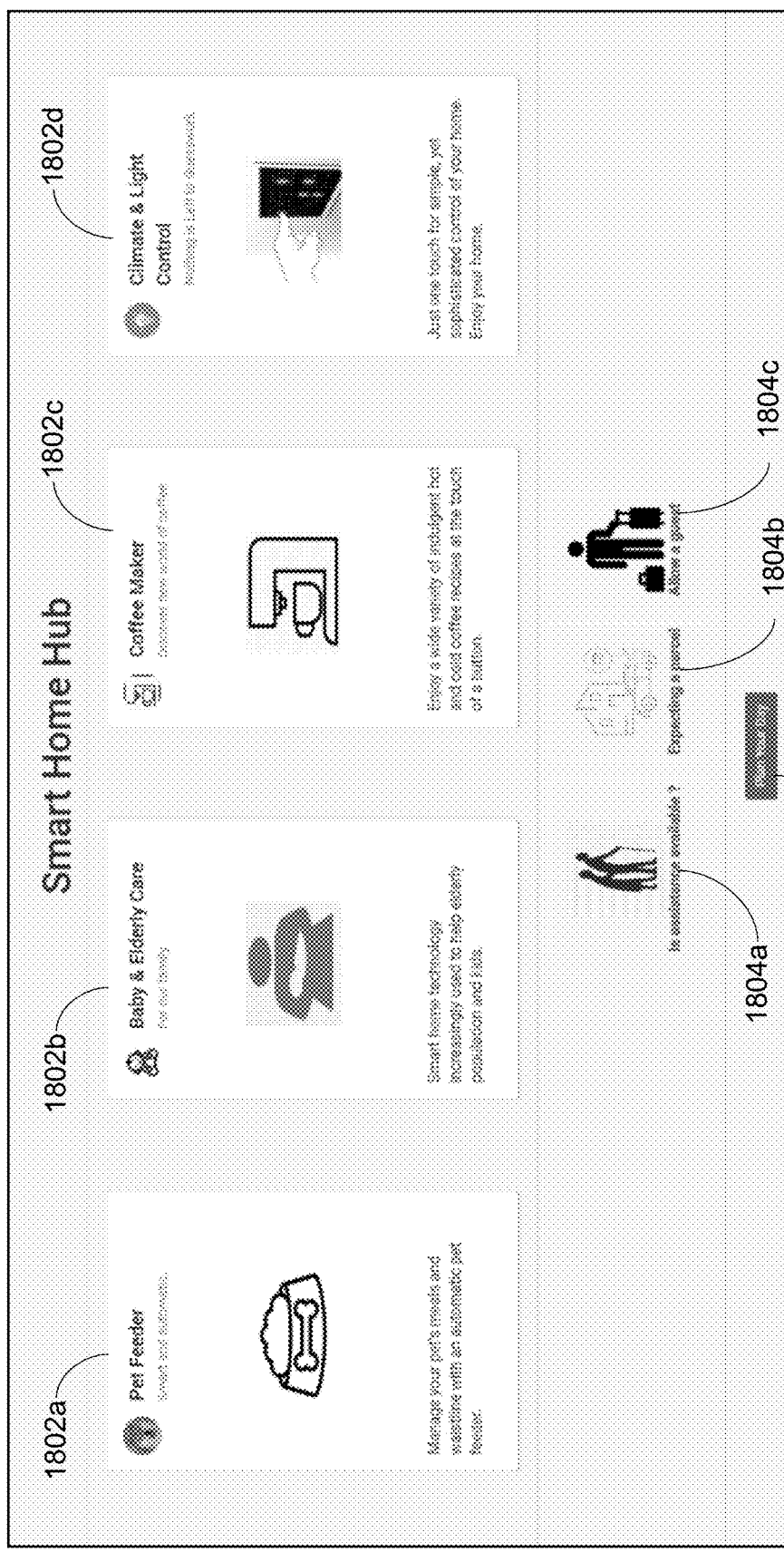
FIG. 18 is an example smart home hub page, which helps demonstrate an example use case.

FIG. 18 is an example smart home hub page, which helps demonstrate this example use case. The smart home hub page (accessed in step S1702 of FIG. 17) provides an overview of functions accessible via the web application, which may run on a "node.js" server in certain example embodiments. The smart home hub page includes devices connected to the smart home. In this case, the devices include a pet feeder 1802a, baby and elder care technology 1802b, a coffee maker 1802c, and a climate control and lighting system 1802d. Icons indicative of fields are provided. These fields may be used to indicate certain states, whether certain events are expected to occur, etc. In the FIG. 18 example, a first field 1804a is used to indicate whether elderly assistance is available, a second field 1804b is used to indicate whether a parcel is expected, and a third field 1804c is used to allow a guest. There is also a button 1806 enabling the user to plan the day. It will be appreciated that the example devices 1802a-1802d and the example fields 1804a-1804c are provided by way of example and without limitation. Different example embodiments may incorporate some or all of these and/or other devices/technologies, and different example embodiments may incorporate some or all of these and/or other fields.

Figure 19:
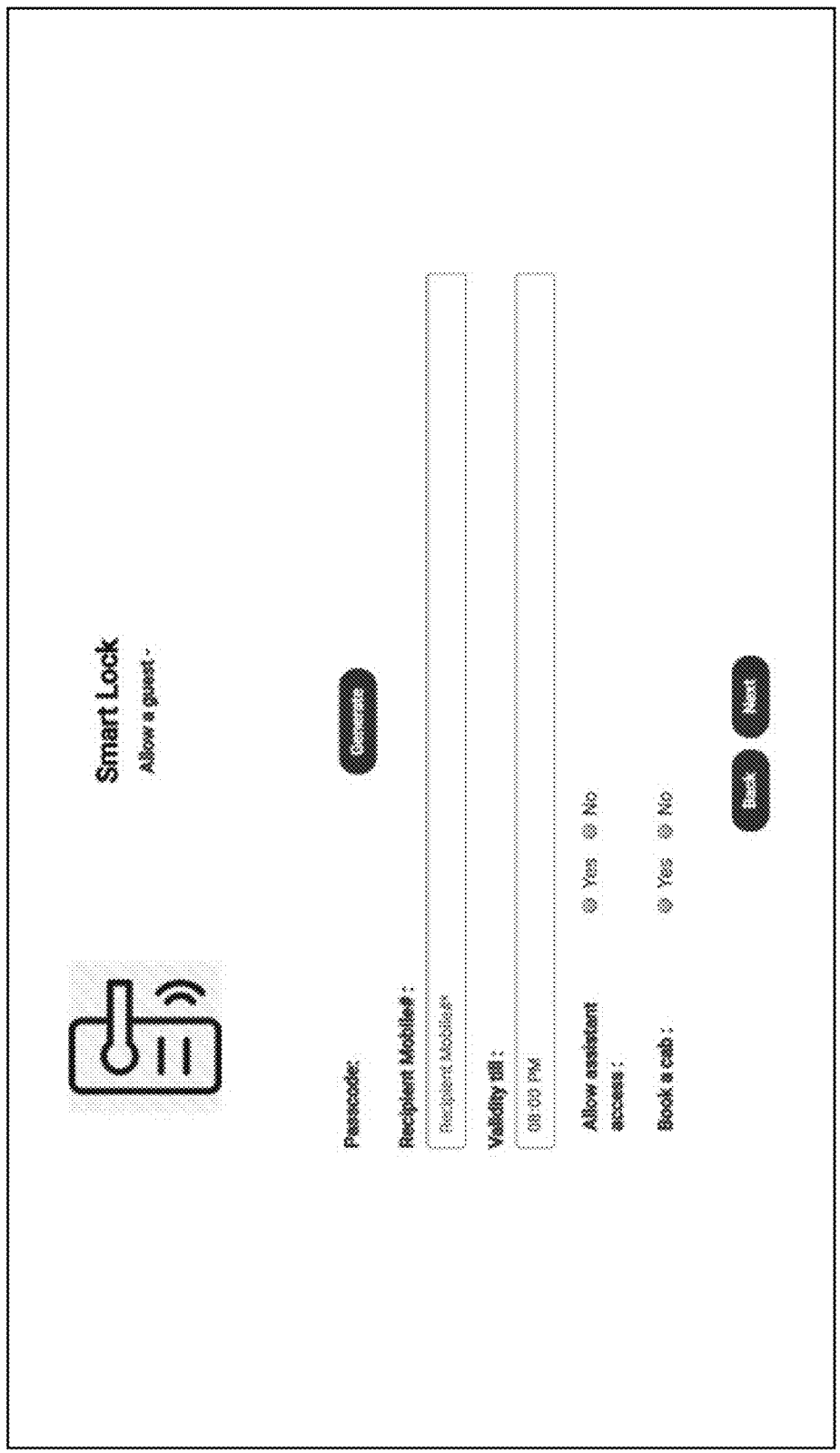
FIG. 19 is an example smart lock page that can be used with the FIG. 17 example use case.

Based on the selection of one or more of the fields 1804a-1804c, rules to navigate the end user to the appropriate next page or web resource can be configured. For example, selecting the third field 1804c to allow a guest may redirect the user to the smart lock page (step S1704 in FIG. 17). FIG. 19 is an example smart lock page that can be used with the FIG. 17 example use case. The smart lock page can be used to generate a passcode and share it with a guest so that the guest has access to the home or other location, based on the functionality of the smart lock. In this case, smart lock passcodes can be generated automatically (e.g., using a random number generator or the like), the duration of the passcode's validity can be set, and the sharing of such information can be performed via SMS (or other) messaging.

Figure 20:
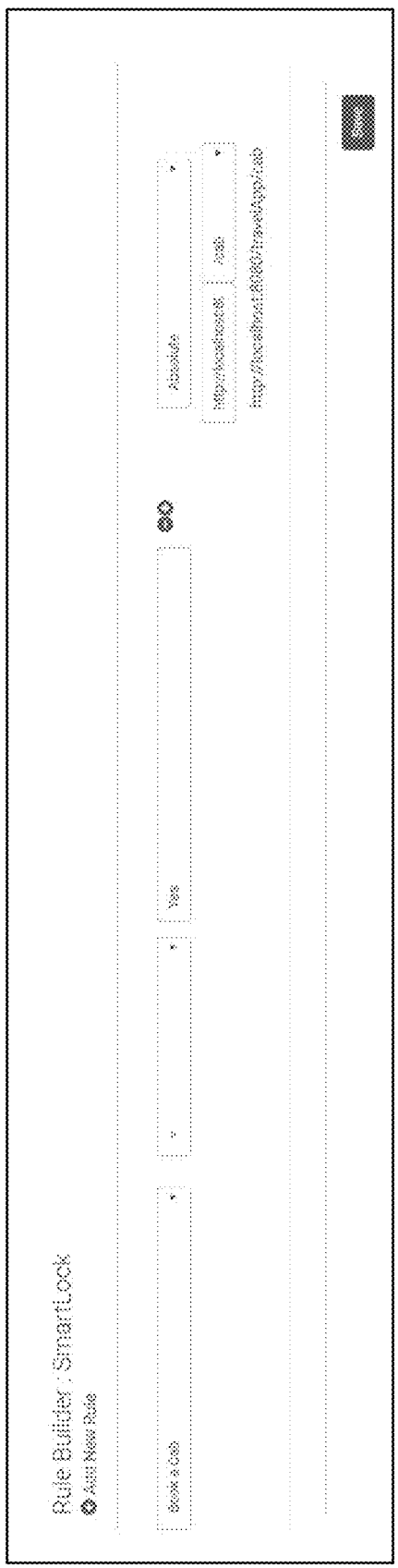
FIG. 20 is an example rules definition page, indicating that navigation is to continue to an external web application (in this case, a taxi hiring component) when appropriate.
Figure 21:
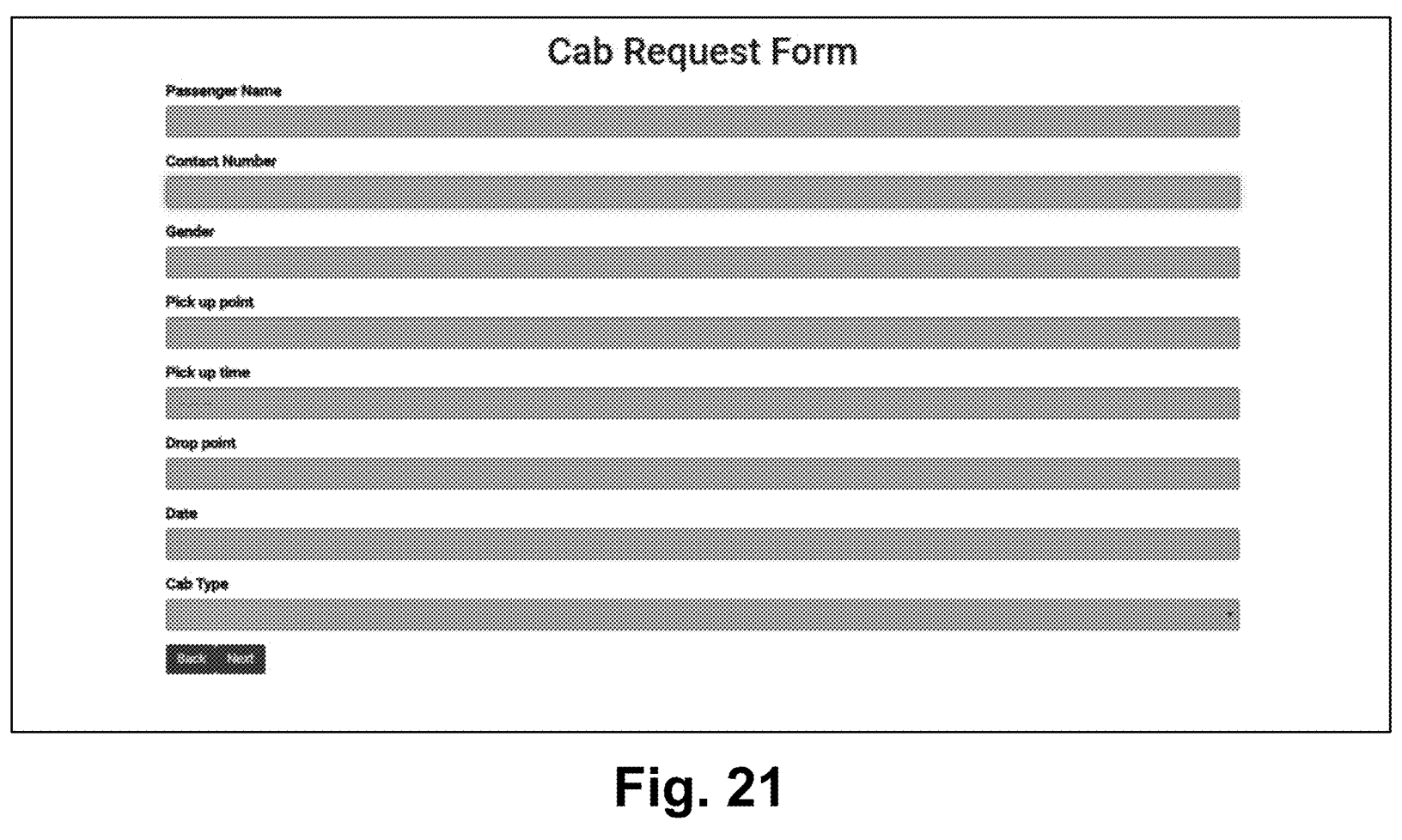

A default route from the smart lock page can be configured so that the user journey continues to the baby care page. Alternatively, on selection of the "book a cab" indicator on the smart lock page, a different action can be taken. For example, a rule can be configured to navigate the user to the cab booking page (step S1706 in FIG. 17) that is part of a different application altogether. That different application may run on a different host in certain example embodiments. FIG. 20 is an example rules definition page, indicating that navigation is to continue to an external web application (in this case, a taxi hiring component) when appropriate. In this example, the application for hiring a taxi is running on a Tomcat container, so the URL to navigate to is provided as an absolute URL. FIG. 21 is an example taxi hiring page that may be reached as a result of the FIG. 20 rule.

Single sign-on (SSO) for authentication between applications may be achieved in certain example embodiments. In certain example embodiments, the existing travel application may need to alter its SSO authentication mechanisms if applicable. For instance, certain example embodiments may implement cookie-based schemes, a server side redirect proxy that injects the required HTTP headers, and/or the like.

As alluded to above, this cab booking page is part of the travel agency web application, which points to the same persistent store as the smart home web application. Thus, in certain example embodiments, a rule for this cab booking page to navigate back to the smart home web application can be configured using the admin UI component of the travel agency web application or a centralized admin UI component in certain example embodiments, such that each individual web application is a different spoke with embedded approaches in each spoke. Thus, in this cross-host navigation scenario, the admin UI and supporting components can either be embedded and co-exist along with the core components as part of the travel application or can be hosted as a separate admin portal web application (as in a hub-and-spoke architecture).

Figure 22:
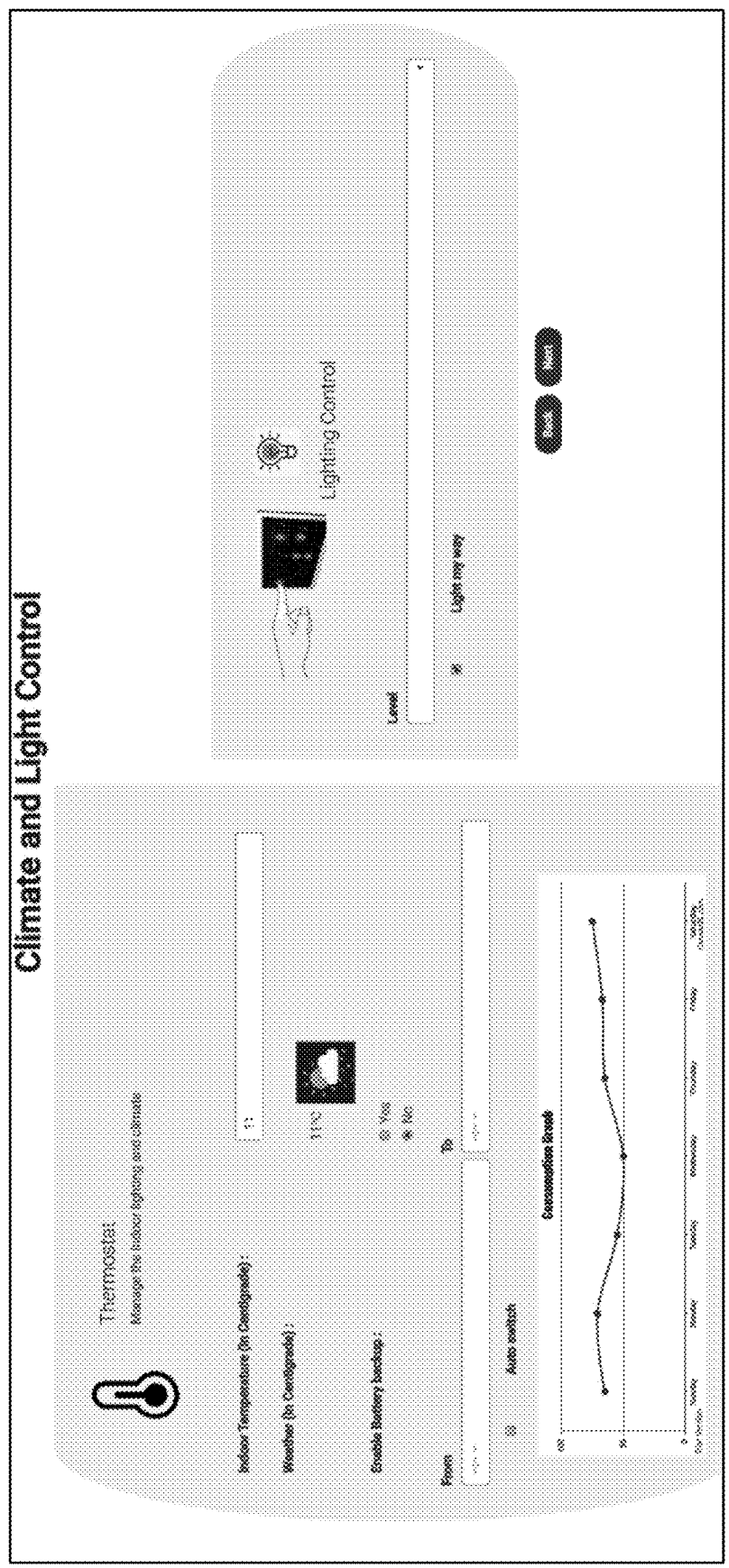
FIG. 22 is a screenshot of an example climate and weather control page.

When the user returns to the smart home application, the user journey continues with the user having the option to configure additional smart devices. For instance, the user could configure the baby feeder smart device using the baby care page (as indicated in step S1708 in FIG. 17) and/or indoor climate control using the climate control page (as indicated in step S1710 in FIG. 17). With respect to the latter, for example, a smart thermostat device may be operably connected to the smart home hub application. The smart thermostat in this example is able to retrieve weather information from an external weather API service, send control signals to the HVAC system for indoor climate control purposes, etc. In this regard, FIG. 22 is a screenshot of an example climate and weather control page. It can be seen that, in this example, the weather service API returns the outdoor temperature, and user can enter a desired indoor temperature or edit a prefilled recommended indoor temperature field.

Figure 23:
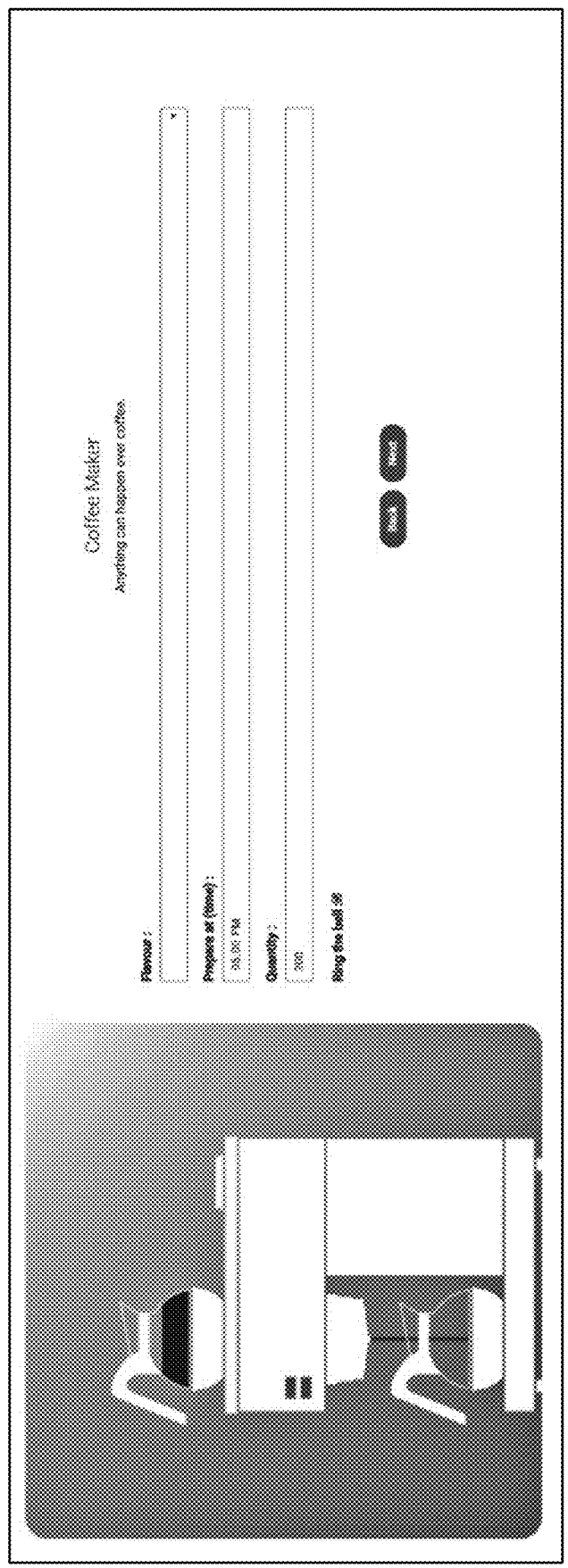
FIG. 23 is an example coffee maker smart device interaction page.
Figure 24A:
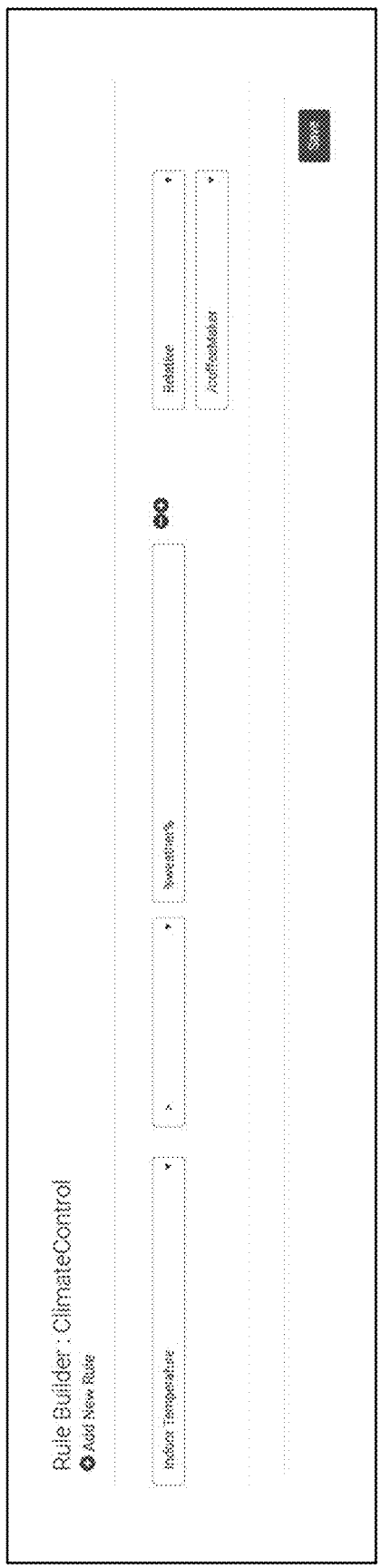
FIG. 24A is a rule configuration page for the coffee maker smart device.

A rule can be configured to specify that, if the indoor temperature is warmer than the outdoor temperature, the user should be asked if a coffee is to be prepared (see step S1712 in FIG. 17). FIG. 23 is an example coffee maker smart device interaction page, which may be used in this regard, and FIG. 24A is a rule configuration page for the coffee maker smart device. In FIG. 24A, both the recommended prefilled indoor temperature as well as the actual outdoor temperature may be provided as input fields. These values may be populated dynamically in certain example embodiments and do not require specification by the user. This is possible because the smart home web application manages these fields and is able to retrieve the values from an in-memory location, from the persistent database, from variables passed in a URL, and/or other suitable location.

Figure 24B:
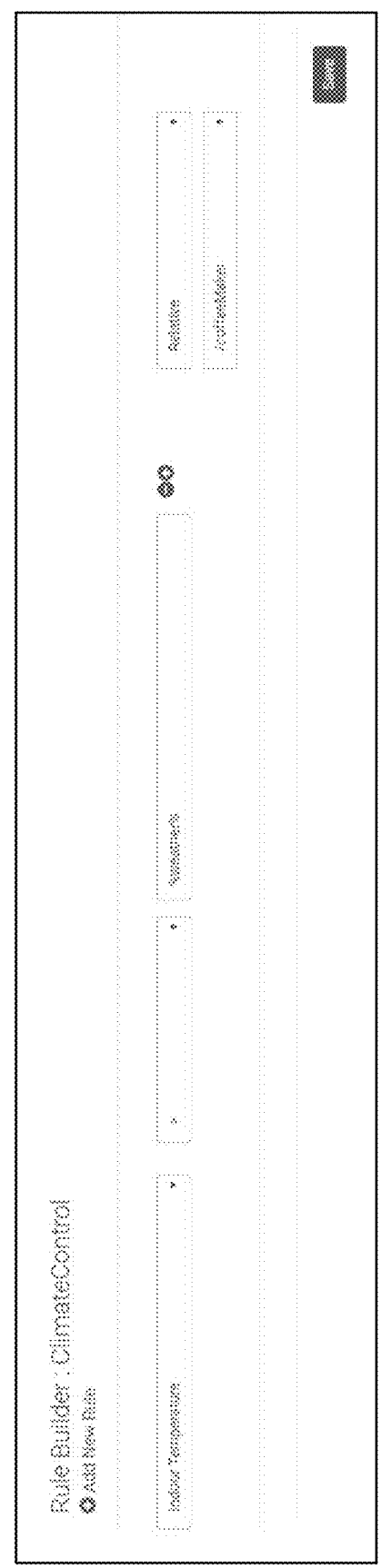
FIG. 24B is a rule configuration page for the coffee maker smart device, which uses a symbolized weather value.

It is noted that variables can be marked or set off with symbols, e.g., to signify that the values are changeable and to improve readability and understandability. In this regard, FIG. 24B is a rule configuration page for the coffee maker smart device, which uses a symbolized weather value. Here, the symbols are percent signs. Thus, the value "% weather %" indicated in FIG. 24B clearly indicates that a variable value is being specified.

Figures 25, 26:
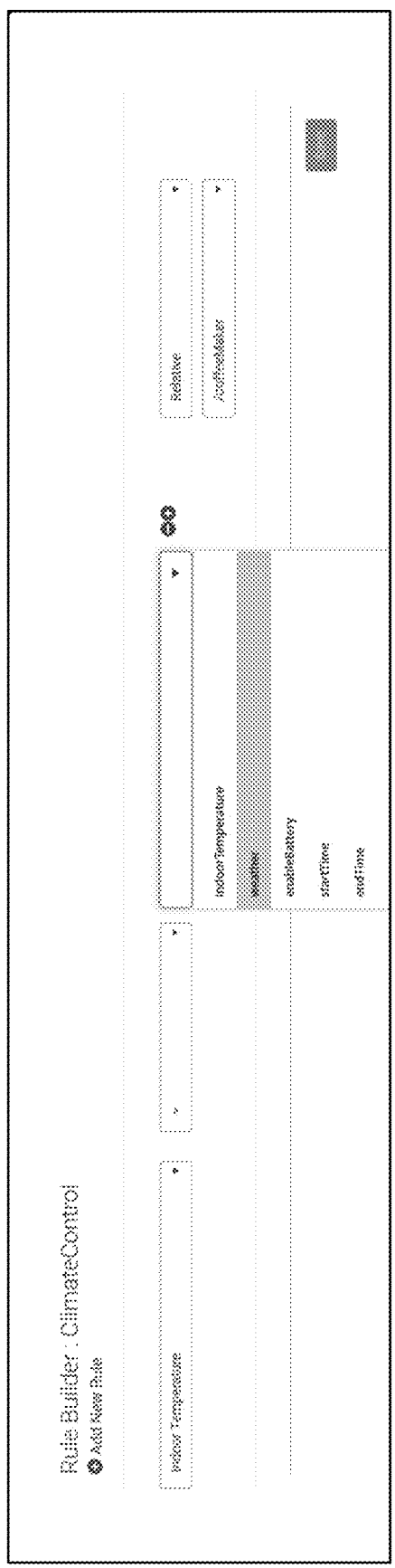
FIG. 25 is a screenshot with a dropdown listing of possible dynamic fields that may be used when configuring a climate control related rule.
FIG. 26 is a screenshot showing a listing of rules configured in connection with the smart home and travel agency example use case.

It is noted that, here, some or all fields may be dynamic inputs. This may differ from earlier example rules (e.g., related to the "allow a guest page"). In this regard, FIG. 25 is a screenshot with a dropdown listing of possible dynamic fields that may be used when configuring a climate control related rule. A default rule can be configured to return to show a thank you page, after coffee is made (step S1714 in FIG. 17).

FIG. 26 is a screenshot showing a listing of rules configured in connection with the smart home and travel agency example use case. The equivalent programmatic representation of rule configured using web wizard are visible here for reference. These rules are used as inputs to the JavaScript expression language parser. It will be appreciated that the conversion from this non-programmatic to a programmatic representation usable by the parser (and vice versa) is performed by the core tools in certain example embodiments.

In view of the foregoing, it will be appreciated that rules can be both configured and changed at runtime. The Typescript and Angular framework aids in this regard by providing a flexible and dynamic framework for certain example implementations. The configured rules are persisted in a lightweight JSON database server in certain example implementations, although different implementations may use different persistent store architectures, NoSQL databases, in-memory options, and/or the like, as alternative or additional architectural components. In this example use case, actions (apart from those related to the persistent store, which typically will be CRUD (create, retrieve, update, delete) operations) are performed at the client side and at runtime, although more centralized and hybrid design architectures are possible in different example embodiments.

In certain example embodiments, the persistent store holds the data for entire navigation graph and a client-side state container or store can be used as a cache to store the entire navigation graph or a sub-graph of it, e.g., for a given page (node). This may help provide for more efficient retrieval and evaluation, as the rules can be retrieved from client-side storage cache thereby reducing the overhead on the persistent store. Because dynamic reconfiguration of rules is supported, a client store-to-persistent store data synchronization mechanism may be provided. For example, retrieval from the persistent store may be scheduled, the server may push updates (configurations or reconfigurations) using web sockets, etc.

The decorator design pattern is used to annotate the items to collect required metadata. The rule builder provides a web wizard or other mechanism to facilitate configuration con-figure of rules on fields or other inputs. The fields that are annotated may be populated by the rule builder in certain example instances, and the configured rules are retrieved from the persistent store. In certain example embodiments, a drag-and-drop interface may be provided so that the user has a visually-driven web wizard with a canvas to view or configure rules. This may aid in forming a navigational graph which in turn can be interpreted to provide the programmatic representation of the rules. In other words, a drag-and-drop or other interface may be provided so that a user can more visually define a navigational flow. The flow may be interpreted as a graph (e.g., treating the pages, navigation rules, and fields as graph elements as discussed above), and the graph can be interpreted as an evaluable programmatic representation for powering certain example embodiments. In certain example embodiments, a visual representation of the data stored in the persistent store may be supplied by and/or viewable as a navigation graph of pages (nodes) and rules (edges), etc.

The rule builder may support validations so that invalid rules, duplicate rules, etc., can be avoided. In certain example embodiments, support for different conflict resolution strategies (e.g., priority tagging, random, first only, etc.) can be provided to address the scenarios where multiple rules are satisfied at the time.

Figure 27:
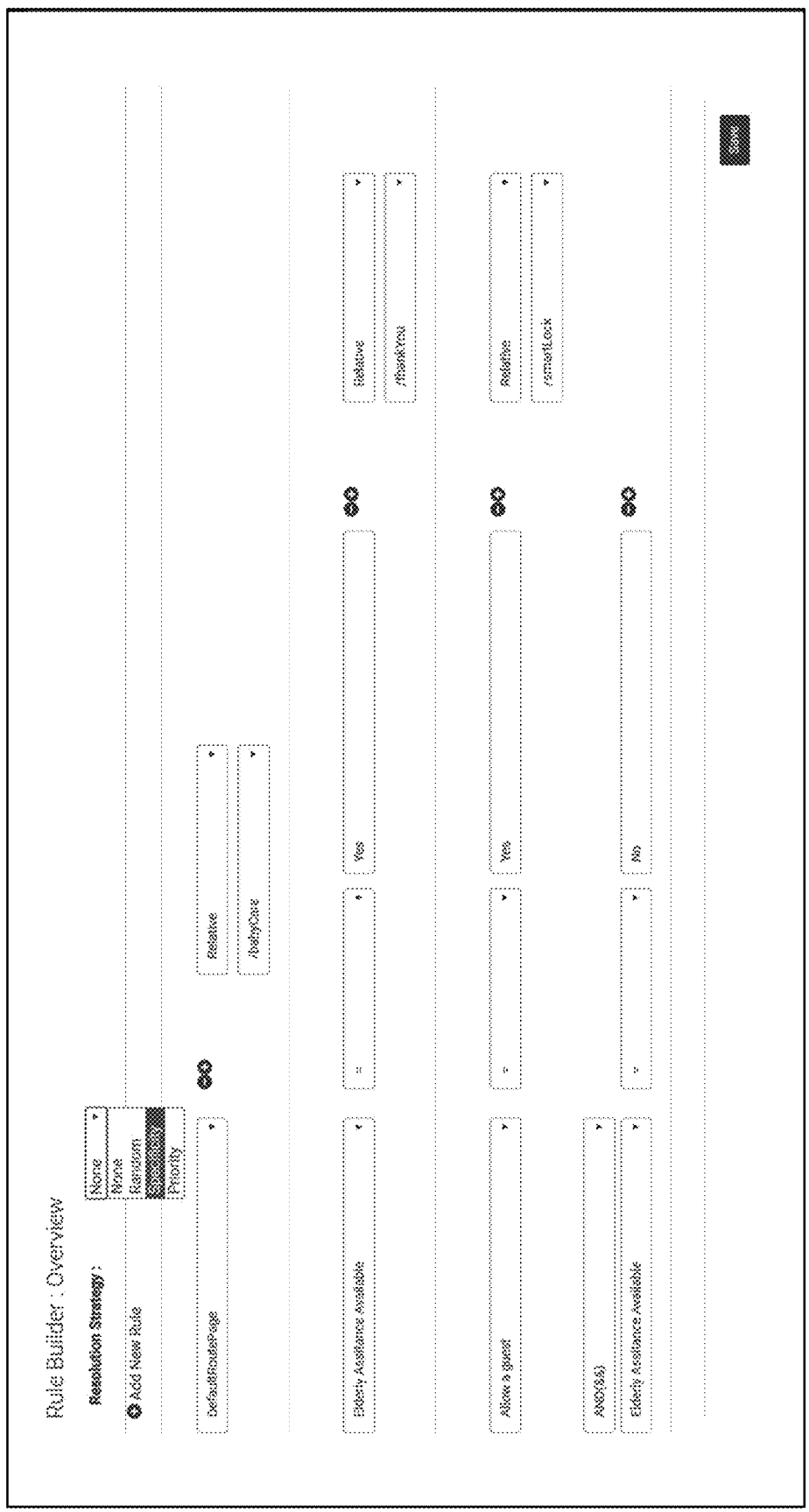
FIG. 27 is a screenshot showing how rule a conflict resolution methodology can be specified in accordance with certain example embodiments.

For example, if there are multiple rules that evaluates to true, the user may be given the ability to select a conflict resolution strategy. Common resolution strategies or any custom strategy can be applied include priority-based, random, first-only, and specific approaches. FIG. 27 is a screenshot showing how rule a conflict resolution methodology can be specified in accordance with certain example embodiments. Here, the user selects the desired policy from a dropdown when specifying the rules.

To facilitate conflict resolution, the rules can be grouped in the event that there are multiple rules configured to a page or likely to be implicated at the same time, and a group identifier can be associated therewith. Then, a particular conflict resolution strategy (e.g., the strategy that is specified by the user using the FIG. 27 example interface) can be associated with the group identifier. In certain example embodiments, the rules can be grouped on a page-by-page basis. When there is a conflict detected by the parser during rule evaluation, the strategy can be looked up based on the group identifier, and the parser can apply the conflict resolution strategy to determine which rule is to be applied.

The inputs or the fields that are part of context object and are used in the rules can be supplied dynamically. For example, they can be variables, specified as the response to an API call or web service invocation, a response to a SQL query to retrieve the value from database, etc. The configured rules are immediately applicable to the application runtime, e.g., without requiring redeployment of the web application. The rule execution and evaluation happens at runtime on the client side, e.g., using a web browser in the case of web applications and using the engine that is made of the building blocks mentioned above.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of executing a web application using a client-side client device including at least one processor and a memory operably coupled thereto, the web application being coded to operate in one of a plurality of different modes, a first mode permitting central rule configuration while prohibiting client-side rule configuration, and a second mode permitting client-side rule configuration, the method comprising:
   in response to an instance of the web application being started up, retrieving metadata using a computer-executable retrieval service embedded in the web application and invoked at a bootstrap hook, the metadata being associated with earmarked programmatic elements in the web application;
   dynamically evaluating, at the client-side client device using an evaluation service embedded in the web application and injected into operation of the instance of the web application, one or more configured rules against input provided in connection with the instance of the web application, the rules being definable in relation to the earmarked programmatic elements using the retrieved metadata, the rules specifying behavior of the web application and being configured in accordance with the mode in which the web application is coded to operate, the rules being both dynamically configurable and dynamically reconfigurable while the instance of the web application is running and being dynamically effective thereafter in the evaluation without requiring redeployment of the web application, even if (re) configured while the instance of the web application is running; and
   controlling the operation of the instance of the web application responsive to the evaluation.

2. The method of claim 1, wherein the metadata provides path, model, component, and label data for the decorated programmatic element associated therewith.

3. The method of claim 1, further comprising storing the metadata to the memory provided to the client device.

4. The method of claim 1, further comprising storing the metadata to a persistent store external to web application.

5. The method of claim 4, wherein the persistent store is shareable by plural different web applications.

6. The method of claim 5, wherein the plural different web applications are interoperable with one another.

7. The method of claim 6, wherein one of the web applications is coded to operate in the first mode and another one of the web applications is coded to operate in the second mode.

8. The method of claim 1, wherein the earmarked programmatic elements are earmarked at design time prior to deployment of the web application.

9. The method of claim 1, wherein the rules specifying behavior of the web application are conditioned at least in part on the input.

10. The method of claim 9, wherein the input comprises user input.

11. The method of claim 9, wherein the input comprises a value from a database, function, and/or remote API call.

12. The method of claim 1, wherein a web application context object is used as at least some of the input for the dynamic evaluation.

13. The method of claim 1, wherein at least some of the rules determine navigation within the instance of the web application.

14. The method of claim 13, wherein the evaluation service is triggered via hooks inserted at different pages in the web application.

15. The method of claim 1, further comprising receiving user input reconfiguring one or more of the rules.

16. The method of claim 15, wherein following the receipt of the user input reconfiguring one of more of the rules, different instances of the web application operating with different client-side client devices function differently in response to the same input.

17. The method of claim 1, wherein the rules are (re) configurable by an end user of the client device.

18. A non-transitory computer readable storage medium tangibly storing instruction that, when executed by a processor of a client-side client device, execute a web application, the web application being coded to operate in one of a plurality of different modes, a first mode permitting central rule configuration while prohibiting client-side rule configuration, and a second mode permitting client-side rule configuration, the execution of the web application comprising:
   in response to an instance of the web application being started up, retrieving metadata using a computer-executable retrieval service embedded in the web application and invoked at a bootstrap hook, the metadata being associated with earmarked programmatic elements in the web application;
   dynamically evaluating, at the client-side client device using an evaluation service embedded in the web application and injected into operation of the instance of the web application, one or more configured rules against input provided in connection with the instance of the web application, the rules being definable in relation to the earmarked programmatic elements using the retrieved metadata, the rules specifying behavior of the web application and being configured in accordance with the mode in which the web application is coded to operate, the rules being both dynamically configurable and dynamically reconfigurable while the instance of the web application is running and being dynamically effective thereafter in the evaluation without requiring redeployment of the web application, even if (re) configured while the instance of the web application is running; and
   controlling the operation of the instance of the web application responsive to the evaluation.

19. The non-transitory computer readable storage medium of claim 18, wherein the metadata provides path, model, component, and label data for the decorated programmatic element associated therewith.

20. The non-transitory computer readable storage medium of claim 18, wherein the metadata is stored to a persistent store external to web application.

21. The non-transitory computer readable storage medium of claim 20, wherein the persistent store is shareable by plural different web applications.

22. The non-transitory computer readable storage medium of claim 21, wherein the plural different web applications are interoperable with one another.

23. The non-transitory computer readable storage medium of claim 22, wherein one of the web applications is coded to operate in the first mode and another one of the web applications is coded to operate in the second mode.

24. The non-transitory computer readable storage medium of claim 18, wherein the rules specifying behavior of the web application are conditioned at least in part on the input, and wherein the input comprises a value from a database, function, and/or remote API call.

25. The non-transitory computer readable storage medium of claim 18, wherein a web application context object is used as at least some of the input for the dynamic evaluation.

26. The non-transitory computer readable storage medium of claim 18, wherein at least some of the rules determine navigation within the instance of the web application, and wherein the evaluation service is triggered via hooks inserted at different pages in the web application.

27. The non-transitory computer readable storage medium of claim 18, wherein user input is received to reconfigure one or more of the rules, and wherein following the receipt of the user input reconfiguring one of more of the rules, different instances of the web application operating with different client-side client devices function differently in response to the same input.

28. A client-side client device, comprising:

at least one processor and a memory, the at least one processor being configured to execute a web application, the web application being coded to operate in one of a plurality of different modes, a first mode permitting central rule configuration while prohibiting client-side rule configuration, and a second mode permitting client-side rule configuration, wherein in response to an instance of the web application being started up, metadata is retrieved using a computer-executable retrieval service embedded in the web application and invoked at a bootstrap hook, the metadata being associated with earmarked programmatic elements in the web application;

using an evaluation service embedded in the web application and injected into operation of the instance of the web application, one or more configured rules is/are dynamically evaluated against input provided in connection with the instance of the web application, the rules being definable in relation to the earmarked programmatic elements using the retrieved metadata, the rules specifying behavior of the web application and being configured in accordance with the mode in which the web application is coded to operate, the rules being both dynamically configurable and dynamically reconfigurable while the instance of the web application is running and being dynamically effective thereafter in the evaluation without requiring redeployment of the web application, even if (re)configured while the instance of the web application is running; and the operation of the instance of the web application is controlled responsive to the evaluation.

\* \* \* \* \*